United States Patent
Borja et al.

(10) Patent No.: US 12,449,414 B2
(45) Date of Patent: Oct. 21, 2025

(54) CALIBRATING AND NORMALIZING AN IMAGER FOR OPTOGENETICS

(71) Applicant: QUIVER HOLDINGS INC., Cambridge, MA (US)

(72) Inventors: Gabriel Benito Borja, Boston, MA (US); Steven Nagle, Cambridge, MA (US); Christopher Werley, Cambridge, MA (US); Yang Lu, Cambridge, MA (US); Adam Barnett, Cambridge, MA (US); Owen McManus, Belmont, MA (US); Graham T. Dempsey, Cambridge, MA (US)

(73) Assignee: QUIVER HOLDINGS INC., Cambridge, MA (US)

( * ) Notice: Subject to any disclaimer, the term of this patent is extended or adjusted under 35 U.S.C. 154(b) by 790 days.

(21) Appl. No.: 17/563,400

(22) Filed: Dec. 28, 2021

(65) Prior Publication Data

US 2022/0205979 A1     Jun. 30, 2022

Related U.S. Application Data

(60) Provisional application No. 63/132,906, filed on Dec. 31, 2020.

(51) Int. Cl.
*G01N 33/483* (2006.01)
*G01N 33/487* (2006.01)
*G01N 33/50* (2006.01)
*G01N 33/542* (2006.01)

(52) U.S. Cl.
CPC ... *G01N 33/5038* (2013.01); *G01N 33/48728* (2013.01); *G01N 33/542* (2013.01)

(58) Field of Classification Search
None
See application file for complete search history.

(56) References Cited

U.S. PATENT DOCUMENTS

| | | | |
|---|---|---|---|
| 3,975,084 A | 8/1976 | Block | |
| 7,316,801 B2 | 1/2008 | Kercso et al. | |
| 7,531,303 B2 | 5/2009 | Dorsel et al. | |
| 7,978,412 B2 | 7/2011 | Moriwaka | |
| 8,908,277 B2 | 12/2014 | Pesach et al. | |
| 9,664,613 B2 | 5/2017 | Wohlstadter et al. | |
| 10,436,713 B2 | 10/2019 | Battrell et al. | |
| 2003/0179374 A1 | 9/2003 | Jaaskelainen | |
| 2004/0110123 A1 | 6/2004 | Maher et al. | |
| 2005/0112757 A1 | 5/2005 | Spence et al. | |
| 2005/0176056 A1 | 8/2005 | Sammak et al. | |
| 2012/0053084 A1 | 3/2012 | Gerber et al. | |
| 2014/0295413 A1 | 10/2014 | Cohen et al. | |
| 2015/0004637 A1 | 1/2015 | Cohen et al. | |
| 2015/0080256 A1 | 3/2015 | Gambini et al. | |
| 2015/0216398 A1 | 8/2015 | Yang et al. | |
| 2017/0246635 A1 | 8/2017 | Buermann et al. | |
| 2017/0248621 A1 | 8/2017 | Putnam et al. | |
| 2017/0270690 A1 | 9/2017 | Chung et al. | |
| 2017/0292961 A1 | 10/2017 | Cohen et al. | |
| 2017/0315430 A1 | 11/2017 | Wang et al. | |
| 2017/0370827 A1 | 12/2017 | Wohlstadter et al. | |
| 2018/0136198 A1 | 5/2018 | Gerber et al. | |
| 2018/0136446 A1 | 5/2018 | Werley et al. | |
| 2019/0154652 A1 | 5/2019 | Ghosh et al. | |
| 2019/0295413 A1 | 9/2019 | Hase et al. | |
| 2020/0158497 A1 | 5/2020 | Arnoult et al. | |

FOREIGN PATENT DOCUMENTS

WO    2000/050872 A2    8/2000

OTHER PUBLICATIONS

Axelrod, 2001, Total internal reflection fluorescence microscopy in cell biology, Traffic, 2(2):764-774.
Candia, 2017, Assessment of variability in the SOMAscan assay, Sci Rep 7(1):14248.
Fest, 2013, Baffle and Cold Shield Design, In: Stray Light Analysis and Control, Society of Photo-Optical Instrumentation Engineers (SPIE), pp. 163-182.
McGorty, 2015, Open-top selective plane illumination microscope for conventionally mounted specimens, Opt Exp 23 (12): 16142-16153.
Simon, 2009, Partial internal reflections on total internal reflection fluorescent microscopy, Trends Cell Bio 19 (11):661-668.
Sluder, 2013, Fluroescent Protein Applications in Microscopy, from Digital Microscopy, Sluder & Wolf, Eds., Elsevier Science & Technology, p. 133.

*Primary Examiner* — Michael D Pak
(74) *Attorney, Agent, or Firm* — Thomas C. Meyers; Sullivan & Worcester LLP

(57) ABSTRACT

The present invention includes methods and systems for optical assays, such as optogenetic assays, of biological activity in which an optical reference signal is used to normalize an optical test signal.

19 Claims, 38 Drawing Sheets

| Compound Name | Nav1.2 (μM) | Nav1.5 (μM) | Nav1.77 (μM) | State Dependence* |
|---|---|---|---|---|
| Amitriptyline | 0.56 | 0.82 | 1.25 | 9.6 |
| Tetracaine | 0.26 | 0.43 | 0.28 | 15.5 |
| Vixotrigine | 1.79 | 0.93 | 1.36 | 29.8 |
| JNJ63955918 | 3.07 | 6.26 | 0.042 | 6.1 |
| PF-05089771 | 0.17 | 10.1 | 0.035 | 42.9 |
| Tetrodotoxin | 0.019 | 3.08 | 0.033 | 4.0 |
| Carbamazepine | 139.4 | 37.1 | 52.6 | 39.9 |
| Funapide | 0.51 | 0.24 | 0.46 | 2.7 |
| Mexiletine | 28.8 | 21.0 | 13.0 | 9.2 |
| Lacosamide | 392.9 | 58.5 | 104.6 | n.a. |
| Lamotrigine | 72.4 | 20.6 | 32.8 | 24.3 |
| MK-0759 | 1.50 | 1.61 | 2.05 | 18.8 |
| lidocaine | 47.2 | 20.1 | 15.0 | 15.4 |
| TC-N-1752 | 0.14 | 1.14 | 0.046 | 10.8 |
| VX-150 | inactive | inactive | inactive | n.a. |

FIG. 35

CALIBRATING AND NORMALIZING AN IMAGER FOR OPTOGENETICS

FIELD OF THE INVENTION

The invention generally relates to optogenetic systems and methods for use in biological assays.

BACKGROUND

Whole plate imaging has been used to assess the electrophysiology of cells in a multiplex format. However, existing plate imagers and their associated techniques suffer from inherent problems.

For example, automated electrophysiology has been used to assess the electrical activity of cells in a sample. Automated electrophysiology uses direct measurement of cells' ion channels and electrical activity using physical electrodes for stimulating and recording cells. However, using physical electrodes for stimulation and recording can open holes in cell membranes, which can lead to intracellular dialysis and damage the cells. This prevents automated electrophysiology from being used in certain complex experiments, which require the intact intracellular molecular machinery or re-use of cells. In addition, automated electrophysiology instruments typically require use of dissociated cells, which can damage neurons and other cell types and lead to loss of cellular compartments, and limit measurements of processes involved in cell-to-cell communication. Moreover, automated electrophysiology assays are expensive, largely due to the specialized assay plates required.

Fluorescent imaging kinetic plate reader (FLIPR) instruments can provide measurements of cellular voltage-gated, ligand-gated, and constitutive channel activity in cells using a multi-well plate format. For voltage gated sodium channel screening using FLIPR methods, cellular activity is generally activated using chemical stimulation of voltage-gated channels. However, the chemical stimuli used may not reflect physiological processes or be indicative of in vivo cellular activity, which can alter the pharmacological responses measured in the assays. That is especially problematic in assays used to screen for drug candidates. In addition, FLIPR-type instruments may lack the temporal resolution to record important ion channel functions and may lack sensitivity to enable use of genetically encoded sensors.

Electrical field stimulation (EFS) with fluorescent readout is a variation of FLIPR. In these methods and instruments, electrodes are incorporated into assay wells to stimulate electrically excitable cells. However, voltage control for this electrical stimulation is limited and nonuniformities in the field can lead to overstimulation or electroporation, which can negatively impact assay performance.

SUMMARY

The present invention includes methods and systems for optogenetic assays of biological activity using an optical multi-well plate reader. The plate reader includes a number of independent optical channels with objective lenses arranged to read optical signals of different wavelengths from and transmit excitation and/or stimulation light of different wavelengths to, individual wells of a multi-well plate simultaneously. Due to inherent variations in biological assays and hardware components, when assaying individual wells across a multi-well plate, it is critical that optical signals detected from individual wells are calibrated.

For example, when measuring levels of a cellular activity in response to a test condition using optical reporters, the measurements may be relative, i.e., a comparison of activity levels before and during a test condition. However, when analyzing data across wells of a multi-well plate, the detected signals may vary amongst wells because, for example, each well contains a different number of cells expressing reporters. Therefore, it is necessary to calibrate the signals detected across wells to provide accurate inter-well or inter-plate comparisons.

Thus, the present invention includes methods and systems that normalize and calibrate readings obtained from signals across different wells of a plate, different plates, and even across geographic locations, time, and/or bioassay conditions. The systems and methods of the invention can calibrate readings to correct any inherent variability across in vitro assays, which provides more accurate predictions for in vivo activity. For example, cells in wells of a plate can be provided with a saturating stimulus, which assures a maximum level of a cellular activity in the cells. The plate reader detects the resulting signal from the reporters contained in each individual well to provide a "reference signal", which in this case corresponds to a maximum level of cellular activity. The reference signal can vary amongst different wells due, for example, to the different number of cells each contains. When the cells are exposed to test conditions that cause the cellular activity, the resulting test signal from an individual well can be calibrated to the well's reference signal. This can ameliorate inter-well variations and allow for accurate inter-well comparisons.

Advantageously, the present systems and methods include all optical methods and systems using optogenetic techniques. Combined with the multi-well plate readers disclosed herein, the methods and systems can provide extremely high-throughput screening, which is orders of magnitude higher than presently available methods. For example, the methods and systems include optogenetic assays using cells expressing optical reporters and actuators of cellular activity. Cells expressing the reporters and actuators are placed in wells of a multi-well plate. Independent optical channels of the plate reader provide stimulus and excitation light to the cells in individual wells. The disclosed plate readers possess an unmatched ability to transmit stimulation light to individual wells at controlled intensities and wavelengths, and thus they can transmit stimulating light to the cells in discrete pulses, at graduated, pulsed, or ramped intensities, and/or as a constant stimulus.

This stimulation light causes the optical actuators to produce a cellular activity. For example, optically activated light-gated ion channels are stimulated and cause a change in membrane potential of cells expressing them. The excitation light transmitted to the cells causes a corresponding optical reporter of cellular activity, e.g., a fluorescent voltage reporter, to produce an optical signal (emission light), indicative of the cellular activity. Emission light can be detected over time to provide a measure of cellular activity in response to the stimulating light.

The methods and systems of the invention also include calibrating these optical signals as detected across the wells of a multi-well plate. Cells in the wells of a plate expressing optical actuators are stimulated by a "reference" stimulus that causes the optical actuators to produce a cellular activity. For example, blue light transmitted at a particular intensity or duration to stimulate light-gated ion channels to change cellular membrane potentials. Because the plate readers disclosed herein can provide unprecedented control over stimulating light, when light is used as the reference stimulus, the stimulus is consistently transmitted across different wells and multi-well plates.

As a result of the reference stimulus, the corresponding optical reporters produce emission light indicative of cellular activity caused by the optical actuators. The signal produced as a result of the reference stimulus is used as a "reference signal". Cells in the wells are also exposed to test conditions modeling biological and/or chemical stimuli. These test conditions cause a cellular response in the cells, which can be measured using the optical reporters to produce a "test" signal. The reference signal can then be calibrated to the test signal to predict the cellular activity caused by exposure to the test conditions.

For example, the stimulating light may be transmitted, or ramped up to be transmitted, at saturating levels. Saturating levels of stimulating light can assure that the optical actuators in the cells will produce a cellular activity. A saturating stimulus can produce a maximal level or defined level of the cellular activity. As a result, the optical signal from the reporters at saturating levels can provide the maximum signal or a defined signal a particular well of an assay can achieve. This may vary across wells of a plate, for example, because wells contain varying numbers of cells expressing the actuators and/or reporters, variability in hardware, and the inherent variability of in vitro assays. The saturating stimulus can be the reference stimulus and the resulting optical signal from a well during the saturated stimulus provides the reference signal. A defined reference signal can be the resulting optical signal from a well during the defined stimulus that provides a measure of activity at a defined level of cell activity, such as when the cell activity is measured at zero mV or at the equilibrium potential for a specific ion conductance mechanism. Cells exposed to the test conditions produce a test signal, which can be calibrated using the reference signal obtained from the saturating stimulus or defined stimulus. In certain aspects, optical signals detected in the absence of the reference stimulus and during the saturating or defined stimulus provide a continuum of cellular activity against which the test signal is calibrated.

Test conditions modeling biological and/or chemical stimuli include, for example, providing the cells with a chemical compound, a mediator of cellular activity, or an electrical stimulus. Test conditions also include transmitting stimulating light to the optical actuator at a specific wavelength, duration, and/or intensity. In certain aspects, the test conditions include those that model a certain biological state, such the local environment of a tissue associated with a specific type of pain signal, a tumor, or other disease or condition. Reference stimuli may likewise be biological and/or chemical stimuli. When using a chemical reference stimulus, a saturating or defined stimulus includes a concentration of a particular compound that causes activation or inhibition of a cellular activity, and the resulting optical signal is used as a reference signal.

In certain aspects, the reference signal is obtained by providing a reference stimulus until a certain threshold or activity is met. For example, transmitting stimulating light at a particular intensity and/or duration to the cells of a sample, until optical reporters in the cells produce a signal indicative of an action potential. In certain aspects, the reference signal is a signal indicative of a certain biological state, such as a tissue associated with a specific type of pain signal, a tumor, or other disease or condition.

The methods and systems of the invention also include the use of multi-well plates with an optical reference in wells of the plate. The optical reference allows readings to be calibrated across different wells, plates, geographic locations, time, and/or bioassay conditions. The optical reference may include a predetermined amount of a fluorescent compound. The fluorescent compound can be excited by excitation light to provide the reference signal. Cells expressing the optical actuator and/or reporter can be excited by the excitation light to provide the test signal. In certain aspects, the signal can indicate the number of cells in each well expressing the actuators and reporters or is a standard indicative of a certain cellular activity or level of activity in the cells.

In certain aspects, the invention provides a method for assaying biological activity, which includes providing a sample comprising cells including optical reporters of cellular activity. The sample is stimulated with a reference stimulus and a resulting optical signal produced in response to the reference stimulus is detected. The method further includes exposing the sample to test conditions that model a biological and/or chemical stimulus of cellular activity. A resulting optical signal produced in response to the test conditions is detected from the sample. The test signal is calibrated to the reference signal to predict a level of activity of the cells in response the modeled biological and/or chemical stimulus.

In certain methods, the calibrating step corrects for inherent variability across a plurality of assays.

The invention also includes methods in which the optical reporters are fluorescent reporters of membrane electrical potential, an action potential, a synaptic signal, a change in membrane potential, a change in intracellular ion concentration, and/or a change in concentration of intracellular mediators.

In certain aspects, the cells also include optical actuators of electrical activity. Optical actuators of electrical activity include, for example, one or more light-gated ion channels. Exemplary light-gated ion channels include one or more algal channelrhodopsins. In certain methods, the reference stimulus is blue light transmitted to the cells.

The invention also includes methods in which the cellular activity is caused by neurons, muscle cells, human embryonic kidney (HEK) cells, such as HEK 293 cells, cardiomyocytes, endocrine cells and/or engineered cells.

In certain aspects, the test conditions include synaptic transmission by pre-synaptic neurons connected to the cells via synapses.

In certain methods, the sample is a multi-well plate and a plurality of wells of the plate include the cells with optical reporters of cellular activity. In such methods, the stimulating step can include transmitting the reference stimulus to the cells in a plurality of the wells. In certain aspects, the reference stimulus is transmitted to every well of the multi-well plate. The invention also provides methods in which the test signal produced in response to the test conditions is simultaneously detected from each of the plurality of wells. The invention includes detecting the test signal from each of the plurality of wells is by a different detection module of a plate reading device.

The methods include those in which the optical reporters are fluorescent reporters of membrane electrical potential, an action potential, a synaptic signal, a change in membrane potential, a change in intracellular ion concentration, and/or a change in concentration of intracellular mediators. In certain methods, the cells are neurons, cardiomyocytes, muscle cells, HEK cells, endocrine cells and/or engineered cells. The methods include those in which the cells comprise optical actuators of electrical activity. Optical actuators of electrical activity include, for example, one or more light-gated ion channels. Exemplary light-gated ion channels include one or more algal channelrhodopsins.

The present invention also provides a system for bioassays. In certain aspects, the system includes a multi-well plate reader device. The multi-well plate reader device includes a plurality of objective lenses arranged to read optical signals from a plurality of wells of a multi-well plate simultaneously. The system further includes a multi-well plate with an optical reference standard in each of a plurality of wells. In certain aspects, the system includes a processing system comprising instructions executable to cause the system to read the optical reference standards from the wells via the objectives. The processing system also calibrates both inter-plate well readings and intraplate well readings for a bioassay that includes reading optical signals from multiple test wells of a multi-well plate using the objectives.

In a system of the invention the readings of the bioassay include detected levels of fluorescence from multiple cellular samples across the multiple test wells.

In certain aspects, the fluorescence is detected at least at a first and a second distinct wavelength. In certain systems, the distinct wavelengths are the emission wavelengths of optical reporters of cellular activity. The optical reporters include, for example, one or more microbial rhodopsins that report membrane potential and/or ion concentration in neurons.

In certain aspects, the calibration corrects for inherent variability across in vitro neural assays.

In certain systems, the reference plate is provided to different users to standardize readings across geographic locations, time, and/or bioassay conditions.

The optical standard of a system of the invention includes a pre-determined quantity of at least one fluorescent molecule.

BRIEF DESCRIPTION OF THE DRAWINGS

FIG. 35 lists tool compounds.

DETAILED DESCRIPTION

Figure 1:
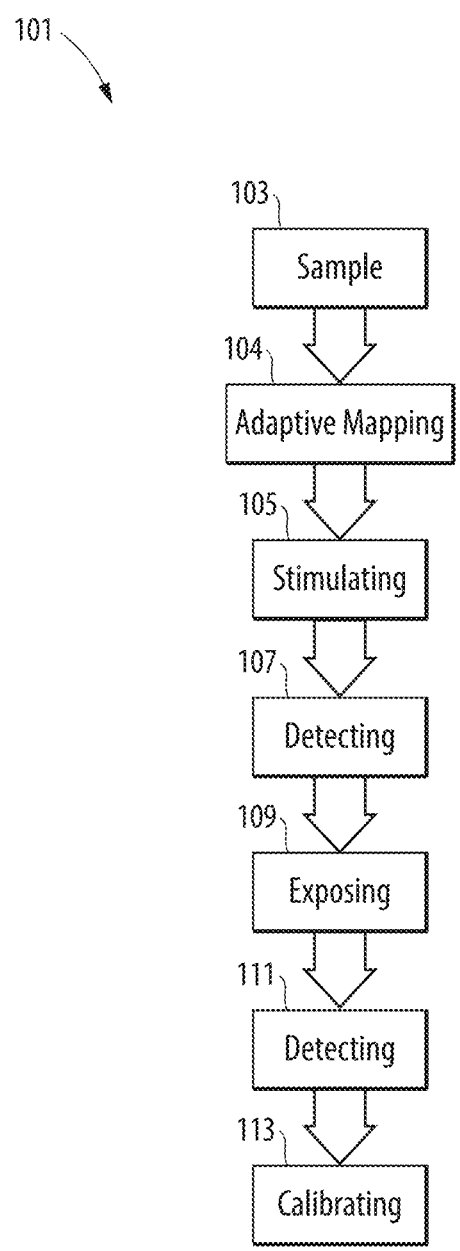
FIG. 1 shows an exemplary method of the invention.

The present invention includes methods and systems for optogenetic assays of biological activity using an optical multi-well plate reader. The plate reader includes a number of independent optical channels with objectives arranged to read optical signals of different wavelengths from wells of a multi-well plate simultaneously, and also provide excitation light and/or stimulation of different wavelengths to the wells. Further, the present invention includes methods and systems that normalize and calibrate readings obtained from signals across different wells of a plate, different plates, and even across geographic locations, time, and/or bioassay conditions. The systems and methods of the invention can calibrate readings to correct any inherent variability across in vitro assays, which provides more accurate predictions for in vivo activity.

Using the described plate reader, certain systems and methods of the invention include complex optogenetic assays. In optogenetics, light is used to control and observe certain events within living cells. For example, light-responsive genes, such as fluorescent voltage reporters can be expressed in cells of a sample. An exemplary reporter is a transmembrane protein that generates an optical signal in response to changes in cell membrane potential, thereby functioning as an optical reporter. When excited with an excitation light at a certain wavelength, the reporter is energized to produce an emission light of a different wavelength, indicating a change in membrane potential. Cells in the sample may also include optogenetic actuators, such as light-gated ion channels. Such channels respond to a stimulation light of a particular wavelength, which causes the channels to initiate an action potential in the cells. The systems and methods of the invention can also be used with additional reporters of cellular activity, and the associated systems for actuating them. For example, proteins that report changes in intracellular calcium, intracellular metabolite or second messenger levels occurring in cell cytoplasm of within specific intracellular compartments, or changes in the membrane potential occurring in membrane defined intracellular compartments including mitochondria, lysosomes, endoplasmic reticulum and other compartments may be used.

A challenge in combining multiple optical modalities (e.g., optical excitation, activation, voltage imaging, calcium imaging) is to avoid optical crosstalk between the modalities. For example, the pulses of light used to deliver optical activation should not induce fluorescence of the reporters; the light used to energize the reporters should not activate the light-gated ion channel; and the fluorescence of one reporter should be readily distinguished from the fluorescence of other reporters. Furthermore, when simultaneously detecting optical signals across a plurality of wells and/or multi-well plates, it is critical that readings between plates and/or wells are calibrated and normalized. The ability of the presently disclosed plate readers to accurately detect and transmit light of different wavelengths permits the use of these modalities within a single assay and allows quick and efficient calibration and normalization of signals across wells and/or multi-well plates.

Using these plate readers, the methods and systems of the invention can be used to observe fluorescent reporters that are sensitive to specific physical properties of their environment, such as biological signals. Biological signals may include, for example, action potentials, synaptic signals, ion concentration (e.g., calcium and sodium) or membrane potentials. The time-varying signals produced by these indicators is repeatedly measured to chart the course of chemical or electrical states of a living cell.

FIG. 1 provides an exemplary method 101 of the invention for assaying biological activity. The method includes providing a sample 103 comprising cells having optical reporters of cellular activity. Cells with the optical reporters may include, for example, neurons, muscle cells, HEK cells, cardiomyocytes, endocrine cells and/or engineered cells. Preferably, the sample includes the cells in wells of a multi-well plate.

The optical reporters of cellular activity may include reporters used in optogenetic assays. The reporters may include, for example, fluorescent reporters of membrane electrical potential, an action potential, a synaptic signal, a change in intracellular ion concentration, and/or a change in concentration of intracellular mediators occurring in cell cytoplasm of within specific intracellular compartments, or changes in the membrane potential occurring in membrane defined intracellular compartments including mitochondria, lysosomes, endoplasmic reticulum and other compartments. An exemplary reporter of cellular activity may include transmembrane proteins that generate an optical signal in response to changes in membrane potential. When excited with a stimulation light at a certain wavelength, such a reporter is energized to produce an emission light of a different wavelength, which indicates a change in membrane potential. Archaerhodopsin-based proteins QuasAr2 and QuasAr3, are such reporters, which are excited by red light and produce a signal that varies in intensity as a function of cellular membrane potential. Similarly, the reporters may include reporters of intracellular ion concentration, such as a genetically-encoded calcium indicator (GECI). Exemplary GECIs include GCaMP or RCaMP variants such for example, jRCaMP1a, jRGECO1a, or RCaMP2. The method 101, further includes stimulating 105 the sample with a reference stimulus that causes the cellular activity. In an optogenetic assay, the stimulus may be light of a particular wavelength, which stimulates an optically modulated actuator of cellular activity. Exemplary optically modulated actuators include light-gated ion channels, such as algal channelrhodopsins, including CheRiff. When a stimulating light beam hits an actuator, such as CheRiff, it causes a conformational change in the protein, thereby initiating a change in membrane potential in a cell expressing the protein. In certain aspects, this reference stimulus is a saturating stimulus that indicates definitive activation of an optically modulated actuator of cellular activity.

The method 101 also includes detecting 107 an optical reference signal from the optical reporters, which was caused by the reference stimulus. In an optogenetic assay of the invention, this may include detecting emission light from a reporter, such as QuasAr2, which indicates a level or change in membrane potential caused by activation of CheRiff by the reference stimulus. In certain aspects, when the sample is in wells of a multi-well plate, detecting 107 may include detecting an average level of emission light, including over time, from one or more optical reporters in a well.

The method 101 may also include exposing 109 the sample to test conditions modeling a biological and/or chemical stimulus of cellular activity. In certain aspects, exposing may include stimulating a sample with one or more wavelengths of light to stimulate one or more optical actuators of cellular activity in the cells of the sample. This may include stimulating the actuators with stimulating light at specified intervals or intensity. Once stimulated, the actuators may cause a cellular activity that models a specific in vivo condition. For example, stimulating CheRiff with stimulating light in a certain manner (e.g., frequency, intensity, and duration) may lead to a particular membrane potential, indicative of a certain neural condition, like pain. Alternatively or additionally, a compound or mediator may be added to the sample, which has the potential or is known to change the activity of the cells in the sample. For example, a compound that modulates an activity reported by an optical reporter can be used.

After exposing 109, signals from the optical reporters are detected 111. These detected signals 111 are calibrated 113 with the detected 107 reference signals to predict a level of activity of the cells in response to the modeled biological and/or chemical stimulus.

In certain aspects, after the signals are calibrated, a test compound can be introduced to the sample to ascertain its effect on the cells.

Figure 2:
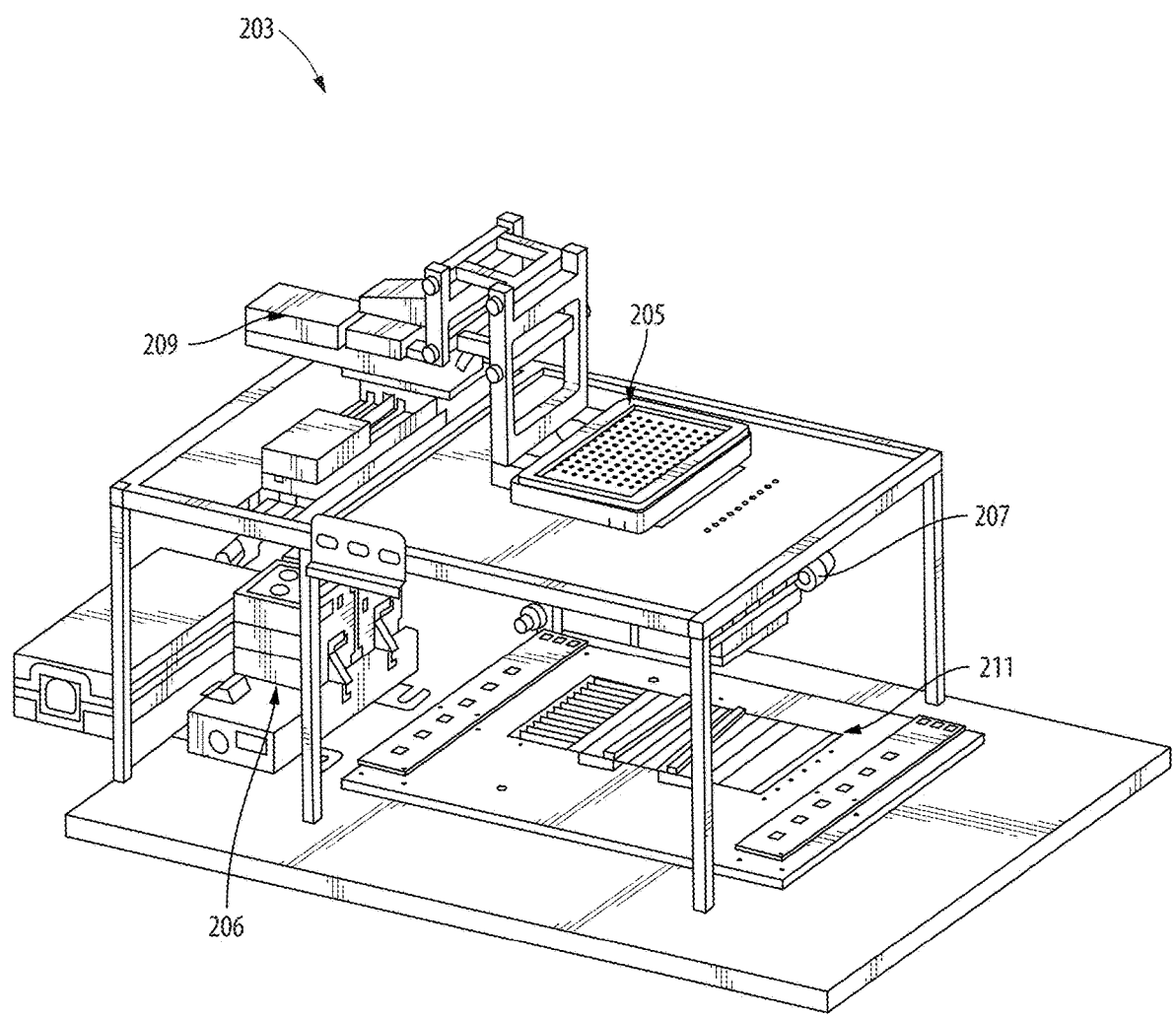
FIG. 2 shows a schematic of a plate reader for use in the invention.

FIG. 2 shows a schematic of a plate reader 203 that can be used with the methods and systems of the invention. A multi-well 205 plate with a sample is positioned on the plate reader 203. The multi-well plate 205 may be, for example, a 48-, 96-, 384-, or 1,536-well plate. One or more wells of the multi-well plate may include the cells of the sample.

The multi-well plate reader 203 includes a plurality of objectives 207 that are arranged to read optical signals from a plurality of individual wells of the multi-well plate 205. The plate reader 203 may read optical signals from a plurality of wells of the multi-well plate simultaneously. The multi-well plate may include an optical reference standard in a plurality of the wells of the multi-well plate 205.

In certain aspects, the plate reader 203 includes a plate pusher or translation stage 209 to align the wells of the multi-well plate 205 with the objectives 207. One or more motor control unit 206 drives operations of the plate reader 203. The plate reader may also include signal/driver boards to send optical signals to a processing system.

Returning to the method 101 and the plate reader 203, when using the plate reader 203 to perform the method 101, the method 101 may include a step of adaptive mapping 104. Adaptive mapping allows a plate reader to measure specific wells of a multi-well plate simultaneously using a plurality of objectives on two read heads.

Figure 3:
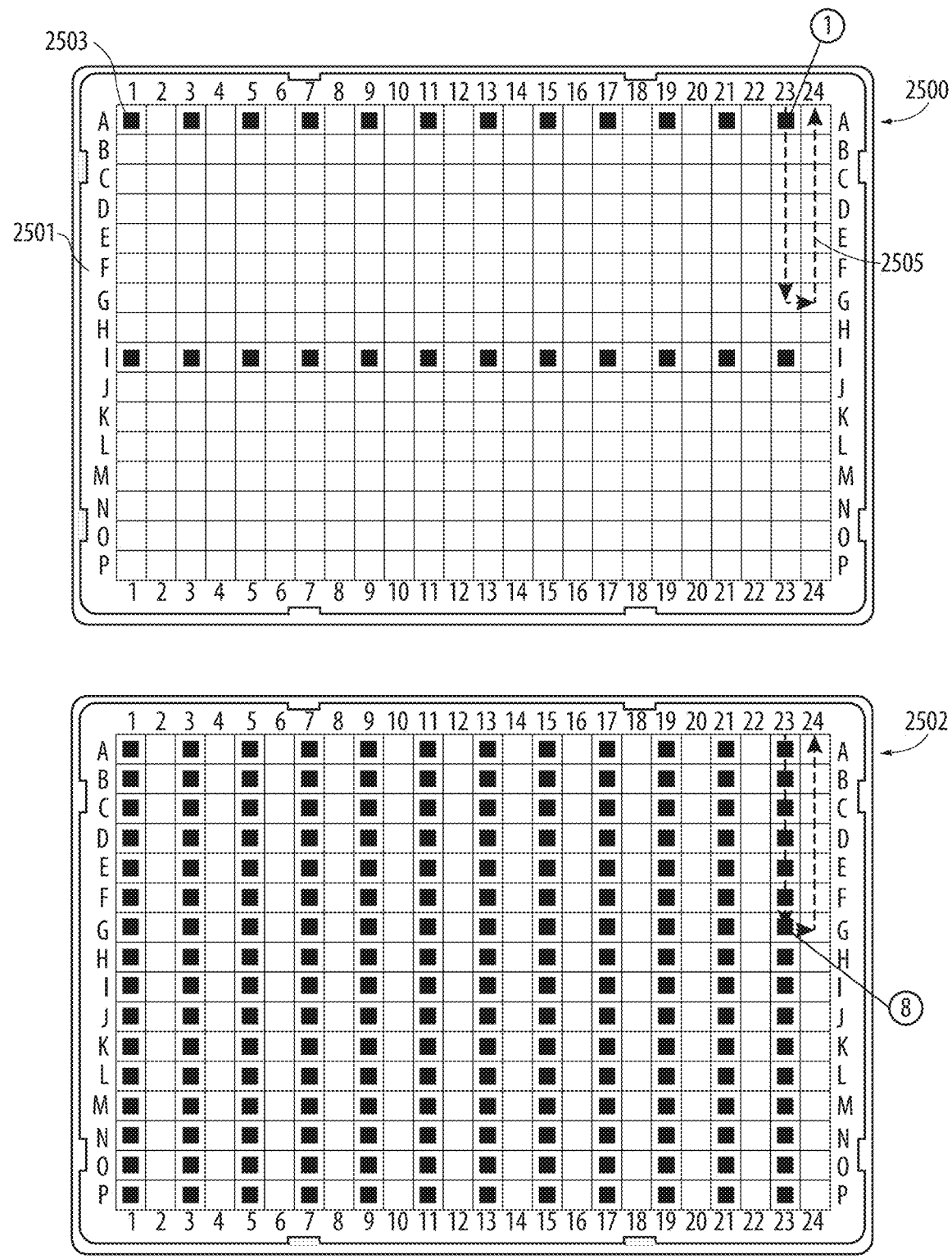
FIG. 3 shows an exemplary imaging path over wells in a plate reader of the invention.

FIG. 3 shows an imaging path over wells using a plate reader of the invention using a plurality of objectives to image across a multi-well plate. Specifically, the figure shows a multi-well plate 2500. The plate 2500 is positioned such that a particular objective is located at a specific well of the plate, in this case at well A,1 defined by the coordinate system 2501 of the plate 2500. The plate reader may be provided with a configuration file, which provides the distance between the objectives. Thus, when a particular objective is aligned with well A,1, the system may interpolate the positions of the other objectives in relation to the wells of the plate.

In FIG. 3, the squares 2503 indicate the locations of the objectives at the first image or field of view (FOV). In this exemplary embodiment, the plate reader has 24 objectives across two read heads as described herein. A plate pusher or translation stage moves the plate such that the objectives iteratively scan wells in accordance with the path 2505. After eight images/FOVs coupled with a movement between each, the plate reader has measured half the wells of the plate 2503. By completing the path 2505, every well of the plate will be individually measured using an objective of the plate reader.

Figure 4:
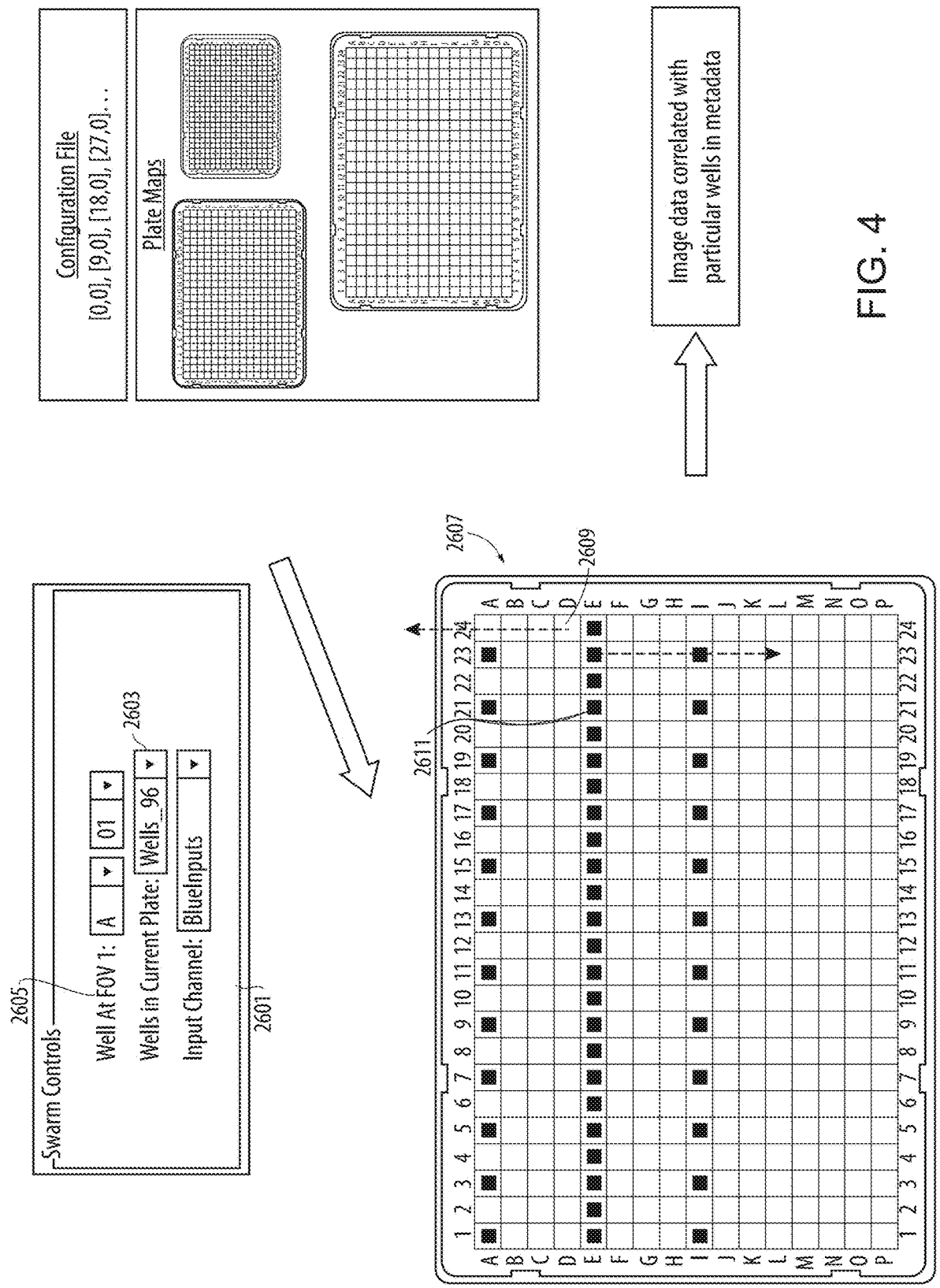
FIG. 4 shows aspects of an adaptive mapping workflow.

FIG. 4 provides aspects of a workflow using an adaptive mapping step. The adaptive mapping step may use software running on, for example, a computer system in communication with a plate reader as described herein and exemplified in FIG. 17.

Using such a system, a user provides an input 2601 that indicates the type of multi-well plate to be imaged 2603, and the alignment of a specified objective with a designated well 2603—in this case well A,1 as described by the naming convention of the multi-well plate.

The system/user may provide a configuration file that defines the distance between objectives on the specific read heads being used. In the exemplified configuration file, the distance between objectives is shown as distances in millimeters using a coordinate system relative to the objective aligned with well A,1. New configuration files may be provided to a plate reader or plate reader system to accommodate new read heads. Similarly, configuration files may be modified to, for example, account for read heads or objectives that require repair and should therefore not be used during a screen.

The system/user may provide plate maps for specific types of multi-well plates, which includes the distances between, and thus locations of, the plate's wells. Software coupled to the plate reader uses the appropriate configuration file, the well alignment at the first FOV, and the appropriate plate map to determine the identity of the wells being imaged by each objective in the first FOV. The system uses this information and provides instructions to the plate reader that cause the objectives to obtain a series of images as the plate is moved 2607 along an instructed path 2609 relative to the objectives. As a result, an image is obtained for every desired well. The system may provide metadata with the obtained images that includes the identity of the well in a particular image.

By tracking the position of the individual objectives in relation to specific wells, users may instruct a plate reader to image only a subset of well on a plate. Thus, if an objective aligns with a well not be scanned 2601, the plate reader may deactivate the objective. Similarly, if a plate reader determine that an objective is not aligned with a well, e.g., because it is positioned beyond the boundaries of a multi-well plate, the system may deactivate the objective for that FOV.

In certain aspects, systems of the invention may incorporate software that automatically correlates the image data and the positional metadata from the plate reader with experimental metadata for each plate/well that is entered by a user.

Figure 5:
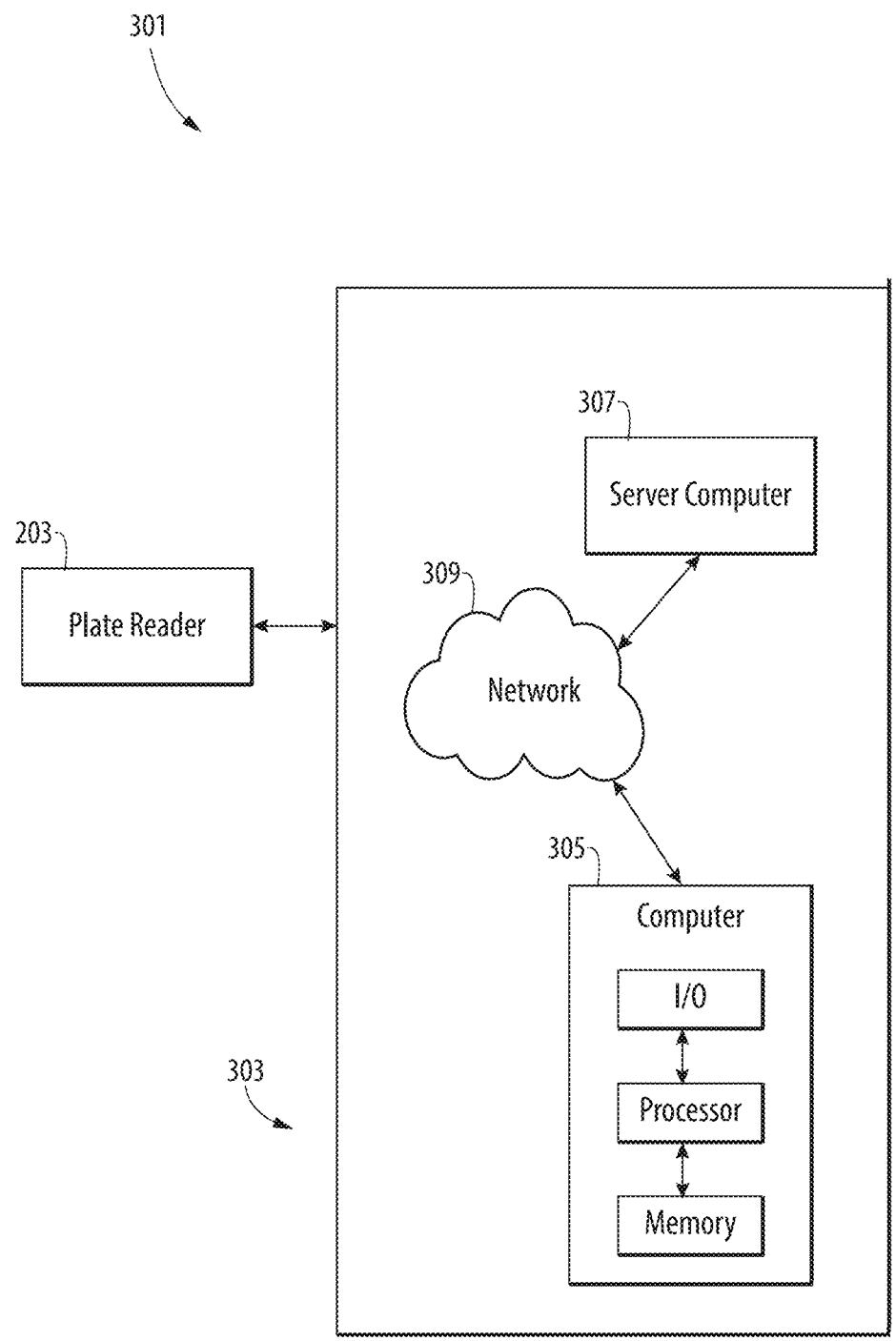
FIG. 5 shows an exemplary system of the invention.

FIG. 5 provides another exemplary system 301 of the invention, which uses the multi-well plate reader 203. The system 301 includes the plate reader 203 and a processing system 303. The processing system 303 may be, or include, a computer 305. Optionally, the processing system 301 may include or access a server computer 307. The one or more of the components of the processing system may communicate with each other or the plate reader 203 via a network 309 connection.

The processing system may include instructions executable to cause the system to read the optical reference standards from the wells via the objectives 207 and calibrate both inter-plate well readings and intraplate well readings for a bioassay. Calibrating may include, for example, reading optical signals test and reference signals from multiple test wells of the multi-well plate 205. Calibrating may correct for inherent variability across in vitro assays, including in vitro neural assays.

In certain aspects, the multi-well plate 205 is a reference plate. The reference plate may be provided to different users to standardize readings across geographic locations, time, and/or bioassay conditions.

Certain methods and systems of the invention include calibrating the optical signals detected of individual wells of a multi-well plate. For example, the optical actuators in the cells in the wells of the plate are stimulated by blue light to stimulate an optical actuator. Over time, the stimulating light can be transmitted to the cells in pulses, ramped up in intensity, and/or provided as a constant stimulus. The disclosed plate readers provide an unmatched ability to transmit stimulation light to individual wells at controlled intensities and wavelengths. As a result, the corresponding optical reporters produce emission light indicative of cellular activity caused by the optical actuators. The emission light is detected over time to provide a measure of cellular activity in response to the stimulating light.

The stimulating light can be transmitted or ramped up to be transmitted at saturating or defined levels. Saturating levels of stimulating light can assure that the optical actuators in the cells will produce a cellular signal. This may include a maximal level of the cellular activity. The optical signal from the reporters at saturating levels can provide the maximum signal a particular well in an assay can achieve. The defined stimulus may provide a measure of cellular activity at a defined level of cell activity, such as at zero mV membrane potential or at the equilibrium potential of a specific membrane conductance mechanism. This may vary across wells of a plate, for example, because wells contain varying numbers of cells expressing the actuators and/or reporters, variability in hardware, and the inherent variability of in vitro assays. A saturating stimulus may be a "reference" stimulus and the resulting the optical signal from a well during the saturated or defined stimulus can provide a "reference" signal. When the cells are exposed to test conditions modeling a biological and/or chemical stimulus of the cellular activity, the optical reporters provide an optical signal indicative the activity. The resulting "test" signal from a well can be calibrated using the "reference" signal to ascertain the cellular activity caused by exposure to the test conditions.

Reference stimuli may be a biological and/or chemical stimuli. When using a chemical reference stimulus, a saturating stimulus includes a concentration of a particular compound that causes activation or inhibition of a cellular activity, which can be used as a reference signal.

In certain aspects, the reference signal is obtained by providing a reference signal until a certain threshold or activity is met. For example, providing optical actuators in the cells with stimulating light for a duration and/or intensity until the cells in the cell produce a signal indicative of an action potential or regenerative signal. The reference signal can also be a signal indicative of a certain biological state, such as a tissue associated with a specific type of pain signal, a tumor, or other disease or condition. In certain aspects, the reference stimulus In certain aspects, the reference signal from multiple or all wells of a multi-well plate are averaged to provide a reference signal to which test signals from individual wells are calibrated.

Figure 6:
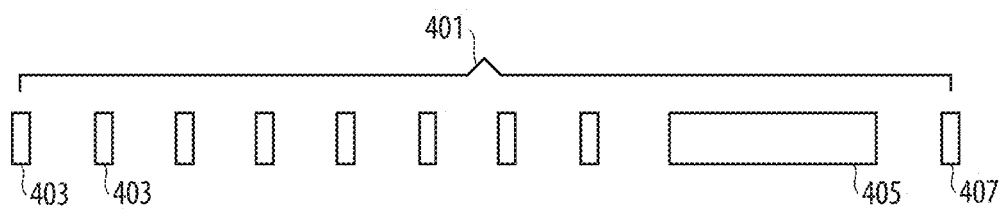
FIG. 6 shows a schematic of light used as reference and test signals.

FIG. 6 provides an exemplary schematic 401 of an assay in which blue light is used as a stimulus to provide a reference stimulus and modeled biological conditions. The cells in the assay are in multi-well plates and caused expressed, for example, a fluorescent voltage reporter, an optical actuator to modulate membrane potential. Short pulses of stimulating light (403, 407) may be transmitted to the sample to simulate the actuator, and model a biological condition, such as an action potential. Optical signals detected as a result of these test pulses are test signals. A steady-state pulse of blue light 405 is used as the reference stimulus. The optical signals detected during the test pulses (403, 407) can be calibrated to the reference pulse 405. In certain aspects, the steady-state reference pulse 405 provides a reference signal that, due to its intensity and/or duration, saturates the sample, and is thus not sensitive to interference from components in the assay, including test compounds.

Figure 7:
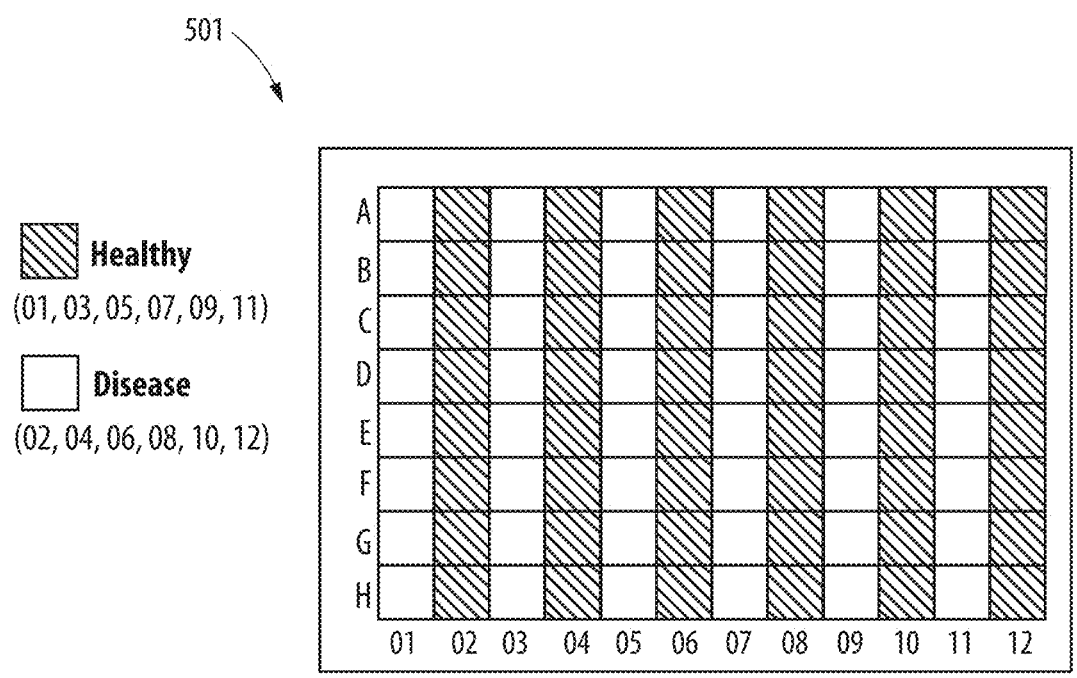
FIG. 7 shows a sentinel plate.

FIG. 7 provides a "sentinel plate" 501, which can be used in the methods and systems of the invention. This exemplary "sentinel plate" is a 96-well plate. However, plates of any size can be used with the methods and systems of the invention, including 48-, 384-, and 1536-well plates.

In the example, the plate includes wells that are labeled "healthy" and "disease". The "healthy" wells can include cells with optical reporters, that when stimulated 105 with the reference signal, provide an optical signal that is detected 107 as the optical reference signal. The "disease" wells can include cells with optical reporters, which are exposed 109 to the test conditions modeling a biological and/or chemical stimulus of cellular activity. The "disease" wells may include, for example, cells with a known genetic mutation that corresponds to a particular disease or condition, cells expressing optical actuators that cause a phenotypic response when activated that is characteristic of a disease or condition, and/or one or more compounds or mediators that cause the cells to respond in a manner characteristic of a disease or condition.

In the systems and methods of the invention, the optical reference signal read from the "healthy" or reference wells can be used to normalize the optical test signal from the "disease" or test well that model a particular biological and/or chemical stimulus of cellular activity.

Figure 8:
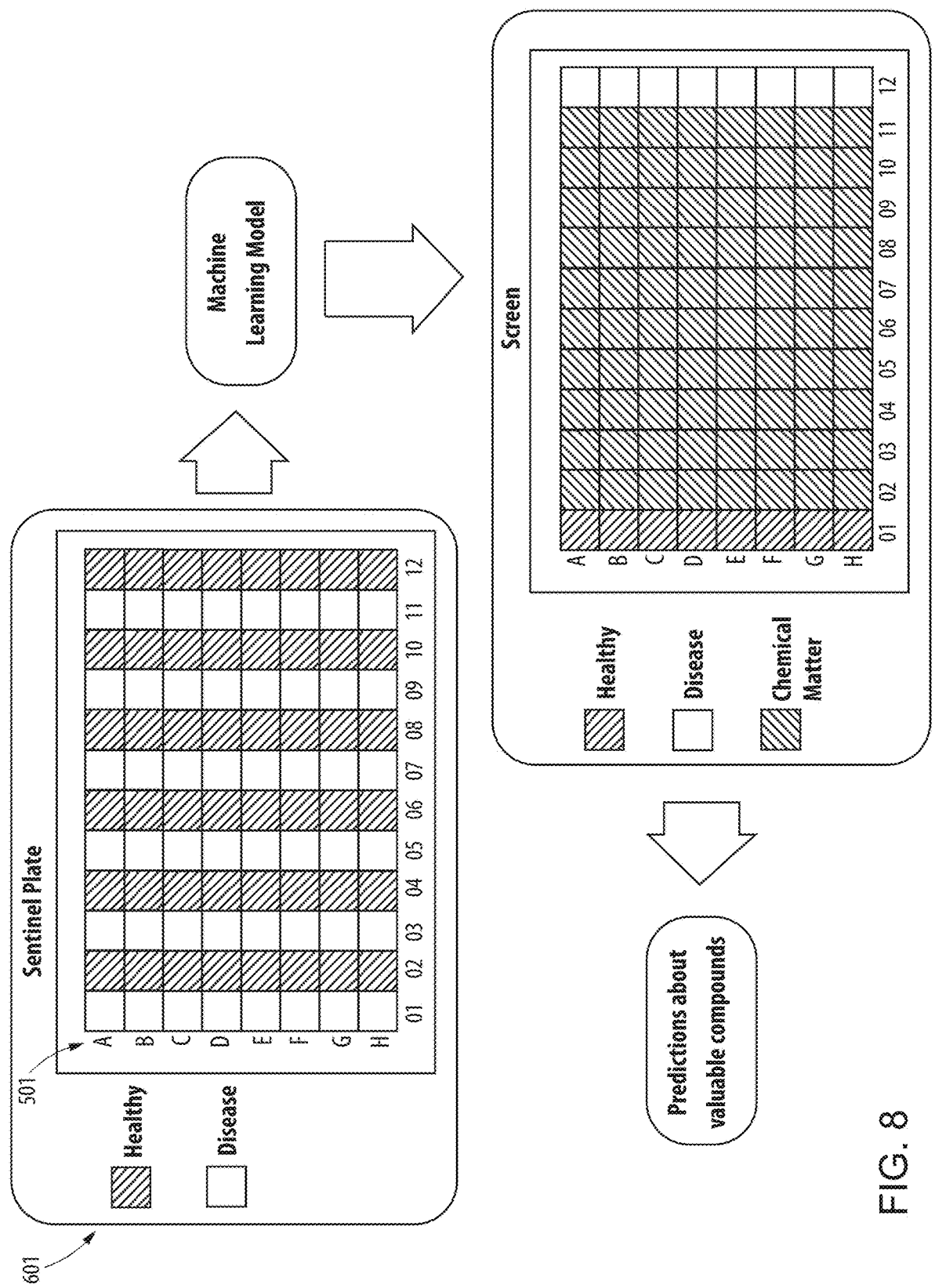
FIG. 8 shows an exemplary method of using a sentinel plate according to the invention.

FIG. 8 provides an exemplary method 601 using the sentinel plate in accordance with the methods and systems of the invention. In certain aspects, the sentinel plate 501 is used to reveal phenotypic characteristics of reference/ "healthy" and test/"disease" cells in a sample using the optical reference and test signals. A machine learning model in communication with, or a part of, the processing system 303 can be used to ascertain these characteristics. A plate, which may or may not be the sentinel plate 501, is prepared in which reference/"healthy" and test/"disease" cell wells have a stimulus introduced, for example, a chemical compound under investigation. Some of the reference/"healthy" and test/"disease" cell wells of this plate can be left free of this stimulus to allow an inter-plate normalization.

Figure 9:
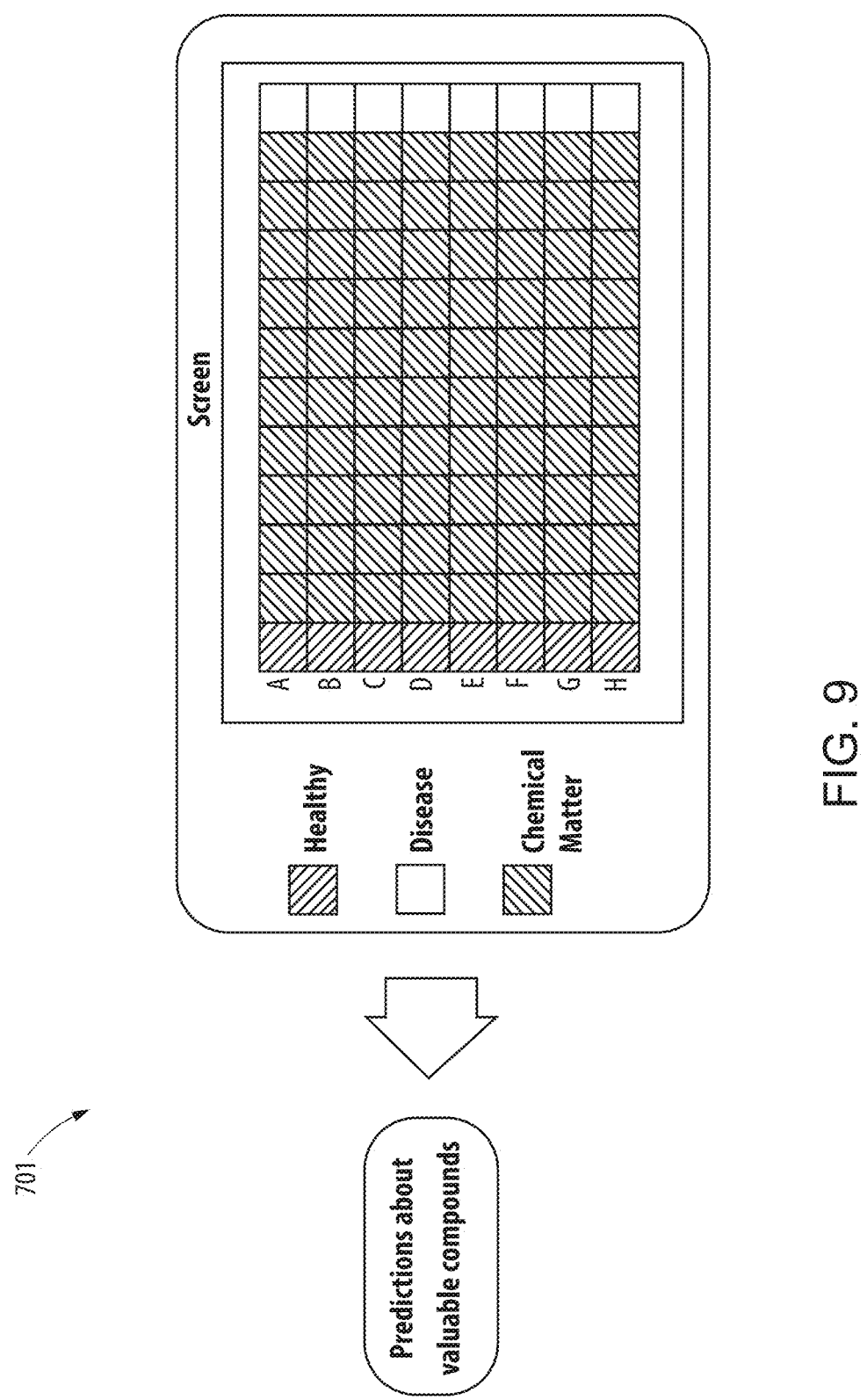
FIG. 9 shows alternative aspects of the invention.

FIG. 9 provides an alternative or derivative method 701 to that of method 701. Once the phenotypic characteristics are known, it may not be necessary to use a sentinel plate 501. Rather, a simple internal normalization is all that is required to produce accurate screening results.

Figure 10:
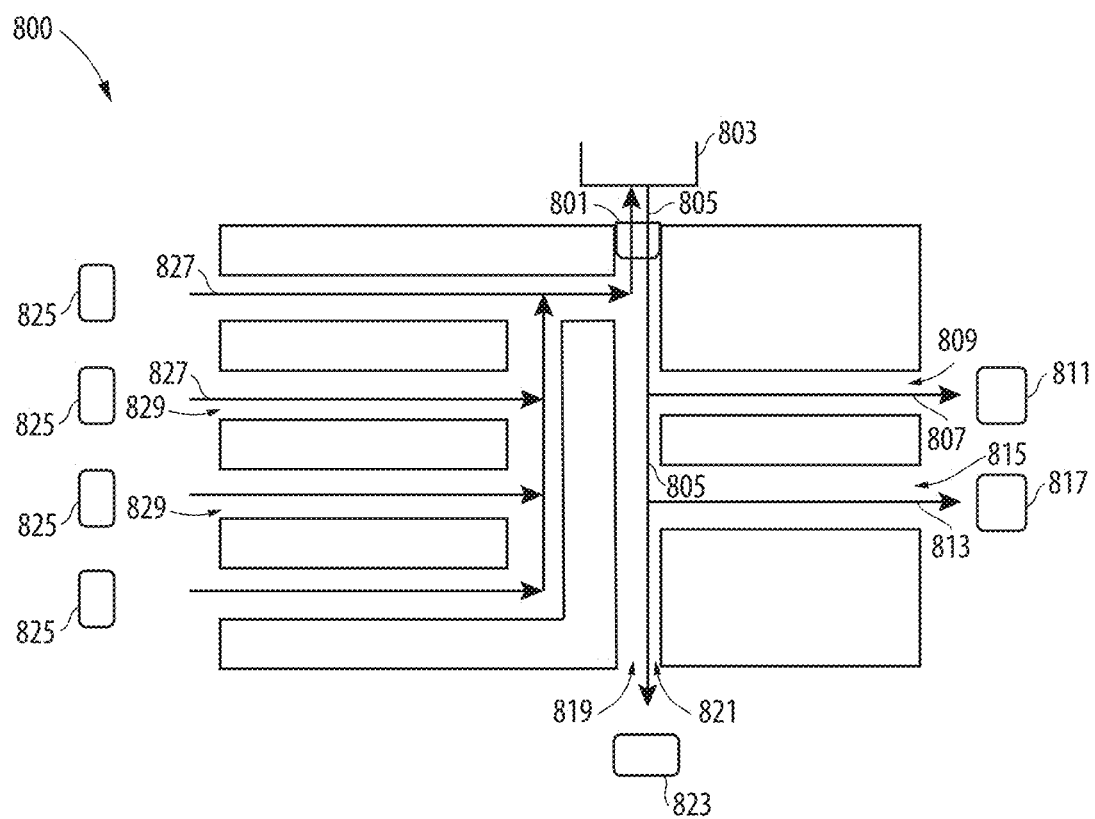
FIG. 10 shows an exemplary optical-channel module.

FIG. 10 provides a general schematic of an exemplary independent optical-channel 800 of an optical-channel module used in a multi-well plate reader used in the methods and systems of the invention. The optical-channel 800 includes an objective lens 801, that aligns with a well 803 of a multi-well plate. Emission light 805 of different wavelengths, such as that from fluorescent reporters, passes along different optical paths to corresponding light detectors. In the exemplary optical-channel module 800, emission light of a first wavelength 807 is passed along a first optical path 809 to a first light detector 811. Emission light of a second wavelength 813 is passed along a second optical path 815 to a second light detector 817. Emission light of a third wavelength 819 is passed along a third optical path 821 to a third light detector 823.

The optical-channel module 800 also includes light sources 825 that transmit stimulation/excitation light at different wavelengths 827, each wavelength along a different optical path 829 through the objective lens 801 to the well 803, which contains a sample. The light sources 825 can independently include an LED, a diode laser bar, a laser, a diode laser, or any other suitable light source. Each light source (825) may be configured to transmit stimulation/ excitation light that is both spectrally distinct from the stimulation/excitation light of each other light source (825) and from emission light from the sample. One or more of the optical paths (829) along which the stimulation/excitation light (827) travels may include one or more dichroic mirrors to reflect the stimulation light through the optical paths and upwards onto the sample. The dichroic mirrors may be configured to allow the emission light (807, 813, 819) from the sample to pass downward through the mirrors and along the emission light optical paths (809, 815, 821) to the detectors (811, 817, 823).

In certain aspects, one or more of the light sources (825) transmits light at a wavelength capable of stimulating a light-sensitive actuator protein. The light-sensitive actuator protein may be, for example, a light-gated ion channel, such as CheRiff, and the wavelength of the stimulation light can be, for example, between 450 and 495 nm. The stimulation light may have an intensity of about 22 mW/cm2. In certain aspects, one or more of the light sources (825) transmits light at a wavelength capable of exciting a microbial rhodopsin, such as QuasAr2 or QuasAr3. The wavelength of the excitation light may be, for example, between 580 and 650 nm. The excitation light may have an intensity between 10 and 400 W/cm2 and preferably about 100 W/cm2. Concurrently or alternatively, one or more of the light sources may, for example, provide stimulation light with a wavelength capable of exciting a light-sensitive reporter protein such as a light-sensitive calcium-indicating protein.

In some embodiments, the stimulation/activation light sources independently include one or more of a diode laser bar, a diode laser, another type of laser, or an LED. The illumination light delivery may include fiber optics. The stimulation/excitation light sources may be part of a stimulation/excitation light subsystem, which may include baffles positioned to prevent unwanted reflected or refracted stimulation/excitation light from entering the objecting lens. The stimulation/excitation light subsystem may also have other beam shaping optics disposed within one of the optical paths along which the stimulation light travels.

As the plate readers allow simultaneous transmission of stimulating/excitation light and detection of emission light of different wavelengths, the plate readers, when used in the methods and systems of the invention, can perform complex assays involving numerous optically actuated and/or detectable proteins.

Thus, samples used methods and systems of the present invention can include cells expressing an optical actuator of electrical activity and an optical reporter of electrical activity. The sample may be configured such that a first cell expresses the actuator and a second cell expresses the reporter. The plate reader can stimulate the light-sensitive actuator protein with a stimulating light beam to cause a conformational change in the protein, thereby initiating a change in membrane potential in the cell. The result is that the cell "fires," i.e., an action potential or regenerative signal that propagates in the electrically-active cell. The plate reader can simultaneously transmit an excitation light beam to a fluorescent optical reporter protein with a beam that is spectrally distinct from that used to stimulate the optical reporter. The plate reader can measure the fluorescence emitted by the reporter to measure corresponding changes in membrane potential.

One example of environmentally sensitive fluorescent reporters for use with the present invention are rhodopsin-type transmembrane proteins that generate an optical signal in response to changes in membrane potential, thereby functioning as optical reporters of membrane potential. Archaerhodopsin-based protein QuasAr2 and QuasAr3, are excited by red light and produce a signal that varies in intensity as a function of cellular membrane potential. These proteins can be introduced into cells using genetic engineering techniques such as transfection or electroporation, facilitating optical measurements of membrane potential. The plate readers of the invention can excite QuasAr2 or QuasAr3 in a sample using light having a wavelength of between 580 and 650 nm. The light may have an intensity between 10 and 400 W/cm2 and preferably about 100 W/cm2.

In addition to fluorescent indicators, the plate readers can be used to optically activate light-sensitive compounds for chemically or electrically perturbing cells. The invention can be used with voltage-indicating proteins such as those disclosed in U.S. Patent Publication 2014/0295413, filed Jun. 12, 2014, the entire contents of which are incorporated herein by reference. For example, an optical actuator of cellular activity may be a genetically-encoded rhodopsin or modified rhodopsin such as a microbial channelrhodopsin. For example, sdChR, a channelrhodopsin from Scherffelia dubia, may be used or an improved version of sdChR—dubbed CheRiff—may be used as an optical actuator. "CheRiff" refers to a version of sdChR that uses mouse codon optimization, a trafficking sequence, and the mutation E154A as described herein.

The plate readers may be used with additional reporters and associated systems for actuating them. For example, proteins that report changes in intracellular calcium levels may be used, such as a genetically-encoded calcium indicator (GECI). The plate reader may provide stimulation light for a GECI, such as yellow light for RCaMP. Exemplary GECIs include GCaMP or RCaMP variants such for example, jRCaMP1a, jRGECO1a, or RCaMP2. In one embodiment, the actuator is activated by blue light, a Ca2+ reporter is excited by yellow light and emits orange light, and a voltage reporter is excited by red light and emits near infrared light.

In certain aspects, the systems and methods of the invention can include using optically modulated actuators that are combined with fluorescent reporters to enable all-optical characterization of specific cell traits, such as excitability. For example, the OptoPatch system combines an electrical actuator protein such as CheRiff with a fluorescent reporter such as QuasAr2. The actuator and reporter proteins respond to different wavelengths of light, allowing membrane potential to be measured at the same time cells are excited over a range of photocurrent magnitudes.

Measuring the electrical properties or activities of cells is useful for the study, diagnosis, and cure of diseases that involve electrically active cells, such as heart and brain cells (e.g., neurons and cardiomyocytes). Conditions that affect these cells include heart disease, atrial fibrillation, amyotrophic lateral sclerosis, primary lateral sclerosis, pain, neural disorders, and many others. All-optical measurements provide an attractive alternative to conventional methods like patch clamping because they do not require precise micromechanical manipulations or direct contact with cells in the sample. Optical methods, especially when used with methods and systems of the invention, are more amenable to high-throughput applications. The dramatic increases in throughput afforded by all-optical measurements have the potential to revolutionize study, diagnosis, and treatment of these conditions.

Thus, the present invention provides methods using the disclosed plate readers that include exciting cells in specific wells of a multi-well plate that are to be observed or stimulating a cell to initiate an action potential or regenerative signal. Stimulation may be direct or indirect (e.g., optical stimulation of an optical actuator or stimulating an upstream cell in gap junction- or synaptic communication with the cell(s) to be observed). Stimulation may be optical, electrical, chemical, or by any other suitable method. Stimulation may involve any pattern of activation including, for example, regular, periodic pulses, single pulses, irregular patterns, or any suitable pattern. Methods may include varying optical stimulation patterns in space or time to highlight particular aspects of cellular function. For example, a pulse pattern may have an increasing frequency. In certain embodiments, the methods may include stimulating an electrically active cell that expresses an optical activator using pulses of light.

For example, the plate readers can be used to characterize the physical properties of cells using fluorescent reporters and light-sensitive actuators of cellular activity. Such assays can be designed, for example, to study the effect of a potential drug compound on cells. For example, the plate readers can be used to optically obtain an action potential (AP) and calcium transient (CT) waveform from stem-cell derived cardiomyocytes to characterize an arrhythmia in the cardiomyocytes. Cardiomyocytes in the sample located in a well of a multi-well plate can be caused to express a rhodopsin-type transmembrane optical reporter. The plate reader can activate a microbial channelrhodopsin with stimulating light, causing an AP to propagate through the cardiomyocytes. Cells containing a reporter protein are illuminated via stimulation light from the plate reader, and the AP causes a change in the fluorescence of the reporter. Light from the reporter is detected by the plate reader and analyzed to construct the AP waveform. An arrhythmia in the constructed AP waveform can be detected or characterized, e.g., by comparison to a known standard or other analytical techniques.

The system and methods of the invention using these plate readers can thus be used to study a compound's effect on cells. Since the plate reader can analyze sample found in wells of a multi-well plate, cells of the sample can be observed while in a supporting cell medium. This allows the activity of cells to be analyzed both before and after introduction of a compound of interest, such as a potential drug, to the sample. The plate reader can thus detect a resulting perturbation to the detected AP waveform and other characteristics associated with exposure to a compound. Since the optical reporter can include a voltage reporter, an ion reporter (e.g., for [Ca2+]), others, or combinations thereof, the plate reader can detect the effect of the compound across multiple ion channels of cells as revealed through all features of the AP waveform.

Moreover, because the plate readers can analyze living cells in wells of a multi-well plate, the cells can be exposed to media that includes compounds, such as mediators, that are used to model a particular in vivo condition. For example, mediators may be selected to model the local environment of a tissue associated with a specific type of pain signal, a tumor, or other disease or condition. The cells in these model conditions may be used to discover or develop therapeutic agents associated with a modeled disease or condition.

For example, samples used in the methods and systems of the invention may include cells that provide in vitro pain models. In these models, compositions of selected pain mediators are introduced to cultured neurons, which then exhibit greatly increased rapidity of firing and hypersensitization. Sensory neurons such as dorsal root ganglion neurons are known to send pain signals to the brain. Sensory neurons, such as dorsal root ganglion neurons, may be exposed to pain mediator compositions in a well of a multi-well plate to create model neuronal signals that would be experienced by the brain as pain. Test compounds can be introduced into the model to screen for compounds that return neuronal signals to a baseline state in the presence of the pain mediator composition.

In certain aspects, the plate readers can be used in methods for assaying biological activity using a sample comprising cells having optical reporters of cellular activity, which includes a normalization step.

In an exemplary method, cells in one or more wells of a multi-well plate are stimulated with a reference stimulus that causes a particular cellular activity. The reference stimulus may be a stimulating light transmitted to the sample from the plate reader, e.g., blue light. This reference stimulus may be a saturating or reference stimulus and may be transmitted to all wells of a multi-well plate. One or more wells containing a sample are then exposed to test conditions that model a biological or chemical stimulus of cellular activity. This may include, for example, providing a stimulating wavelength of light to an optical actuator of cellular activity. The plate reader then detects an optical test signal from optical reporters in the cells of the sample caused by the test conditions. The test signal is then normalized to the reference signal to predict the level of activity of the cells in response to the modeled biological/chemical stimulus.

Figure 11:
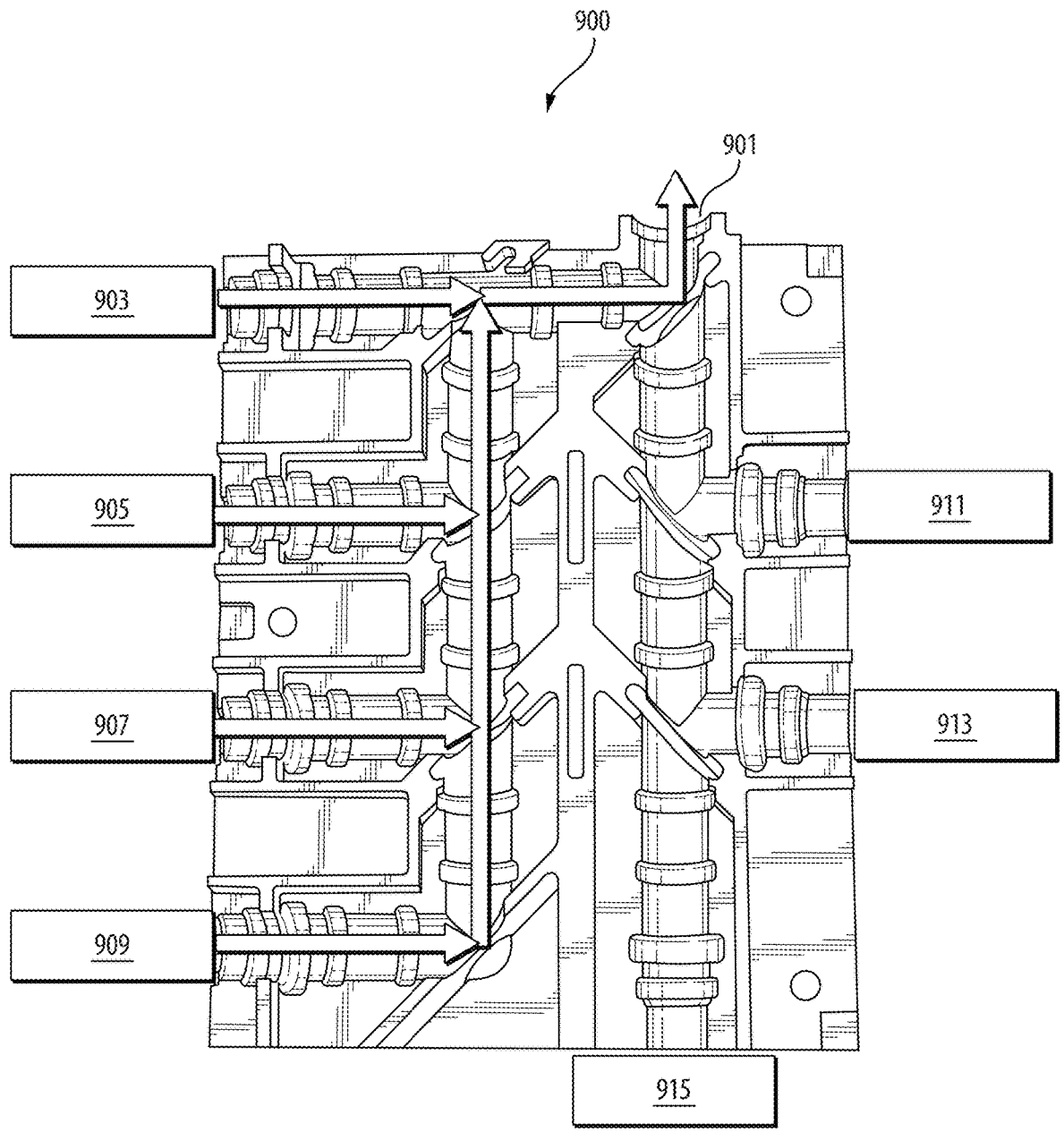
FIG. 11 shows an exemplary optical-channel for use in a plate reader of the invention.

FIG. 11 is a photograph of an exemplary optical-channel 900 of a plate reader. The optical-channel includes an objective lens 901 through which the emission and stimulation light travels. Stimulation light of different wavelengths is transmitted along the different optical paths (903, 905, 907, 909) through the objective lens 901. The emission light optical paths (911, 913, 915) for different emission light wavelengths are also shown.

Figure 12:
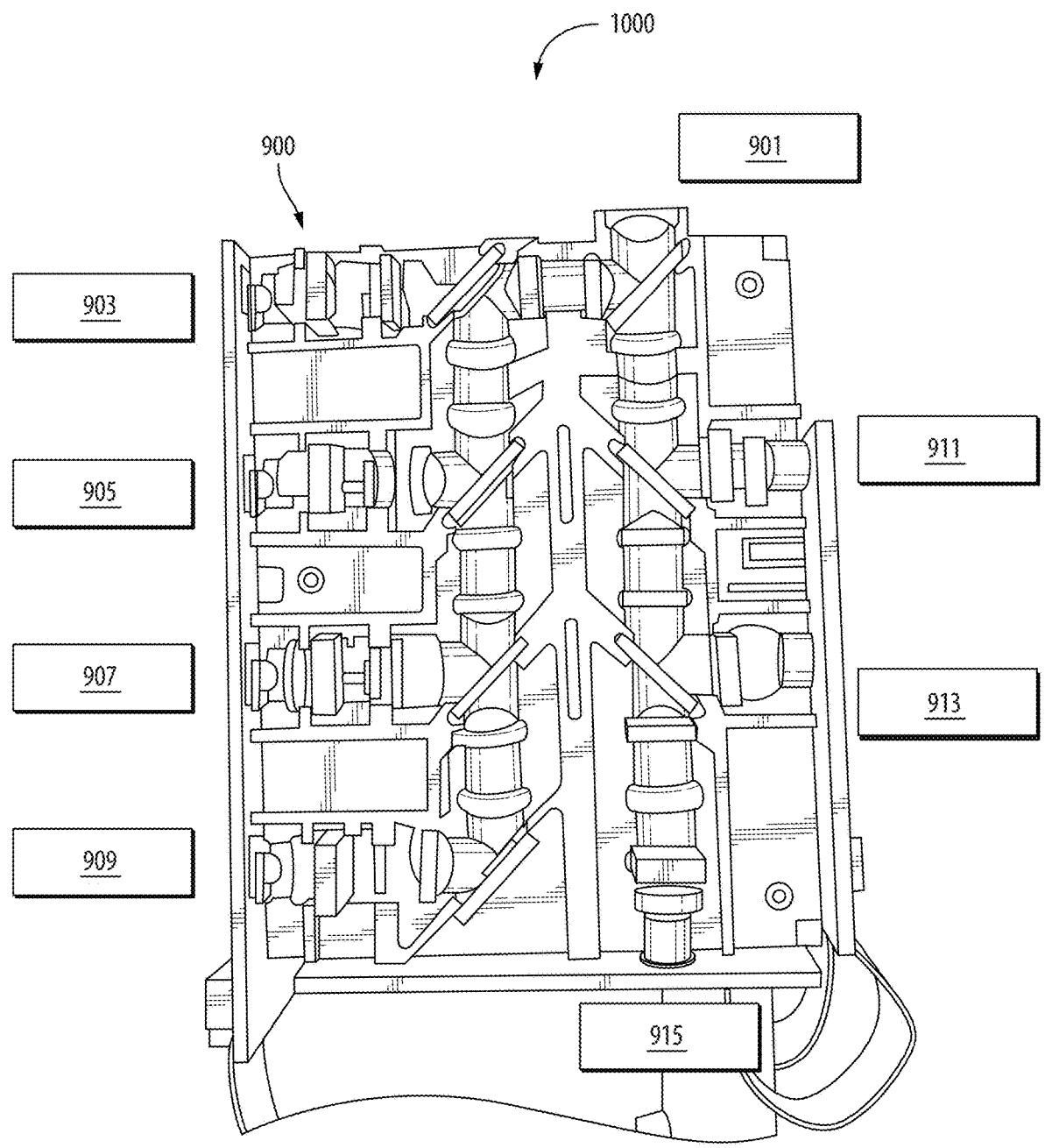
FIG. 12 is a cross-section of the exemplary optical-channel module.

FIG. 12 provides a photograph of a cross-section 1000 of the exemplary optical-channel module 900. As shown, the module 900 and its optical paths (903, 905, 907, 909, 911, 913, 915) include a series of dichroic mirrors, thin film filters, and molded aspheric lenses.

Figure 13:
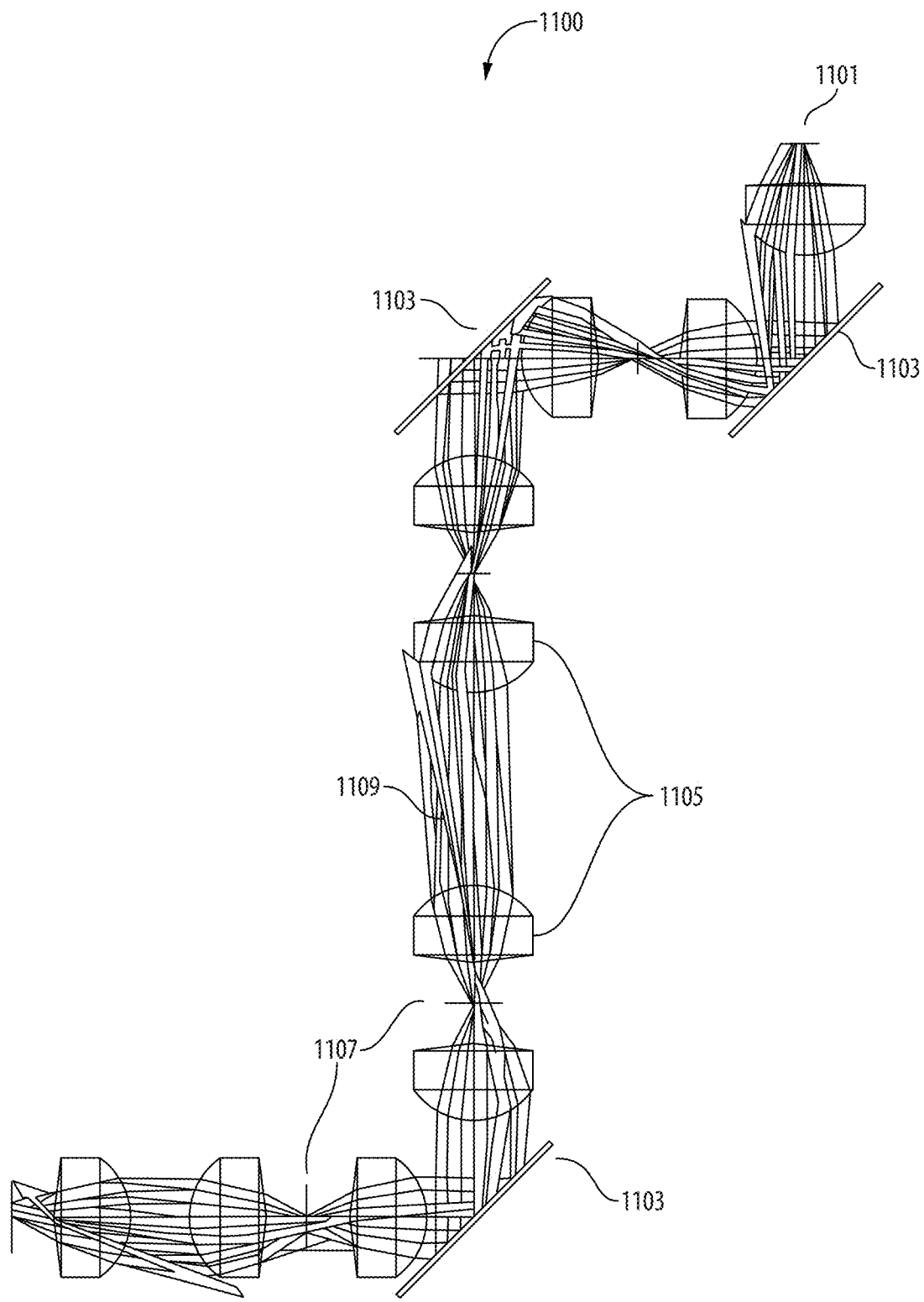
FIG. 13 shows an exemplary optical path through an optical channel of the invention.

FIG. 13 provides a schematic 1100 of an exemplary optical path of an optical-channel. stimulation/excitation light 1109 light is passed through a series of dichroic mirrors 1103, thin film filters, patterned mask 1107, and aspheric lenses 1105, and through the objective lens 1101. The present Inventors have discovered that, when used to detect emission light, this arrangement is surprisingly efficient.

In certain aspects, the multi-well plate reader includes a plurality of independent optical-channels and/or optical-channel modules.

Figure 14:
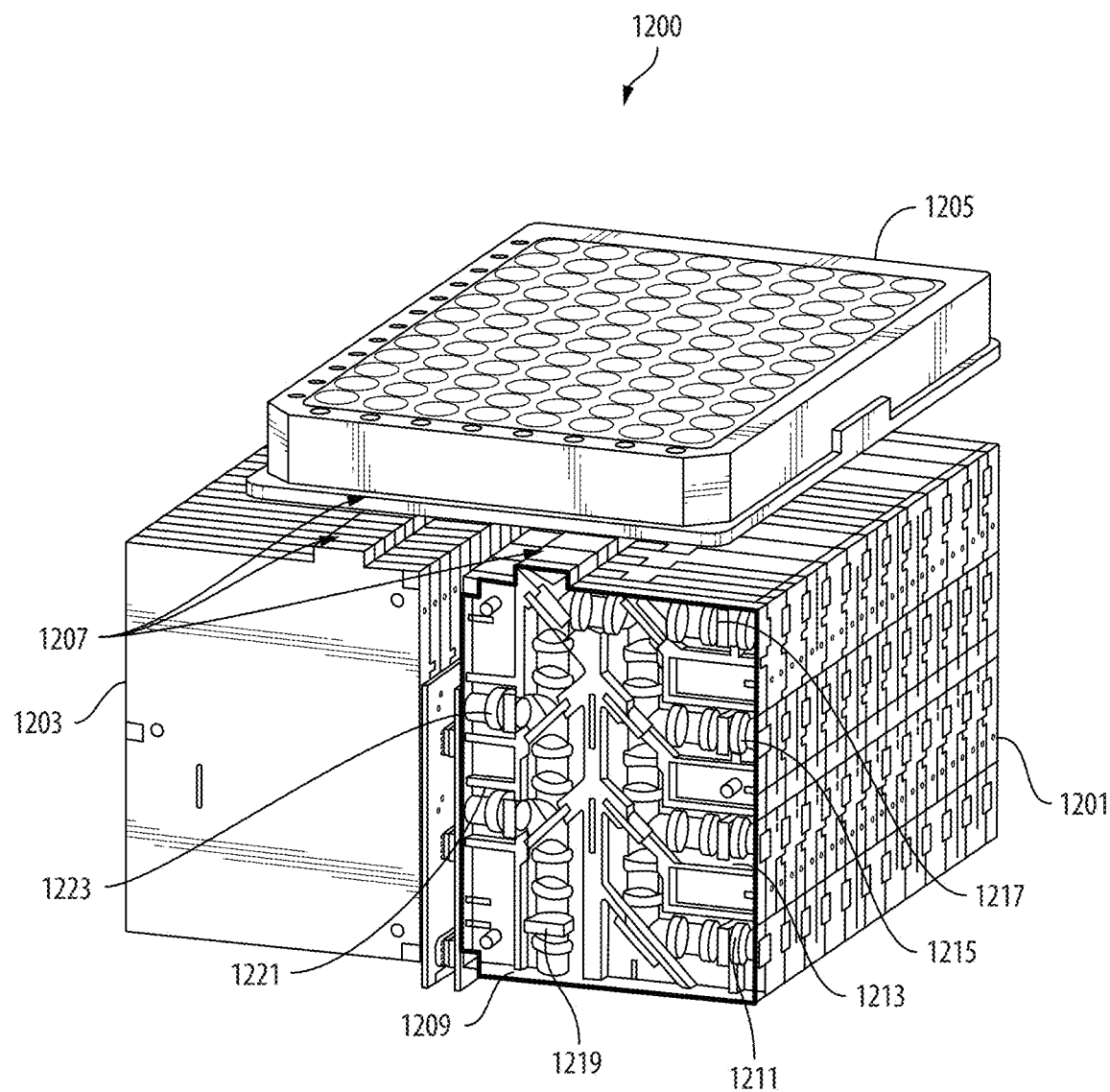
FIG. 14. shows portions of an exemplary plate reader of the invention with two read heads, each with twelve objectives.

FIG. 14 shows a portion 1200 of an exemplary multi-well plate reader. The plate reader includes 2 read heads (1201, 1203), each including 6 independent optical channel modules, and disposed underneath a multi-well plate 1205. Each independent optical channel module includes two independent optical channels. The objective lens 1207 of each independent optical channel is aligned with a different well of the multi-well plate 1205. One of the optical channels 1209 is illustrated as a cross-section to show the stimulation light optical paths (1211, 1213, 1215, 1217) and the emission light optical paths (1219, 1221, 1223).

Figure 15:
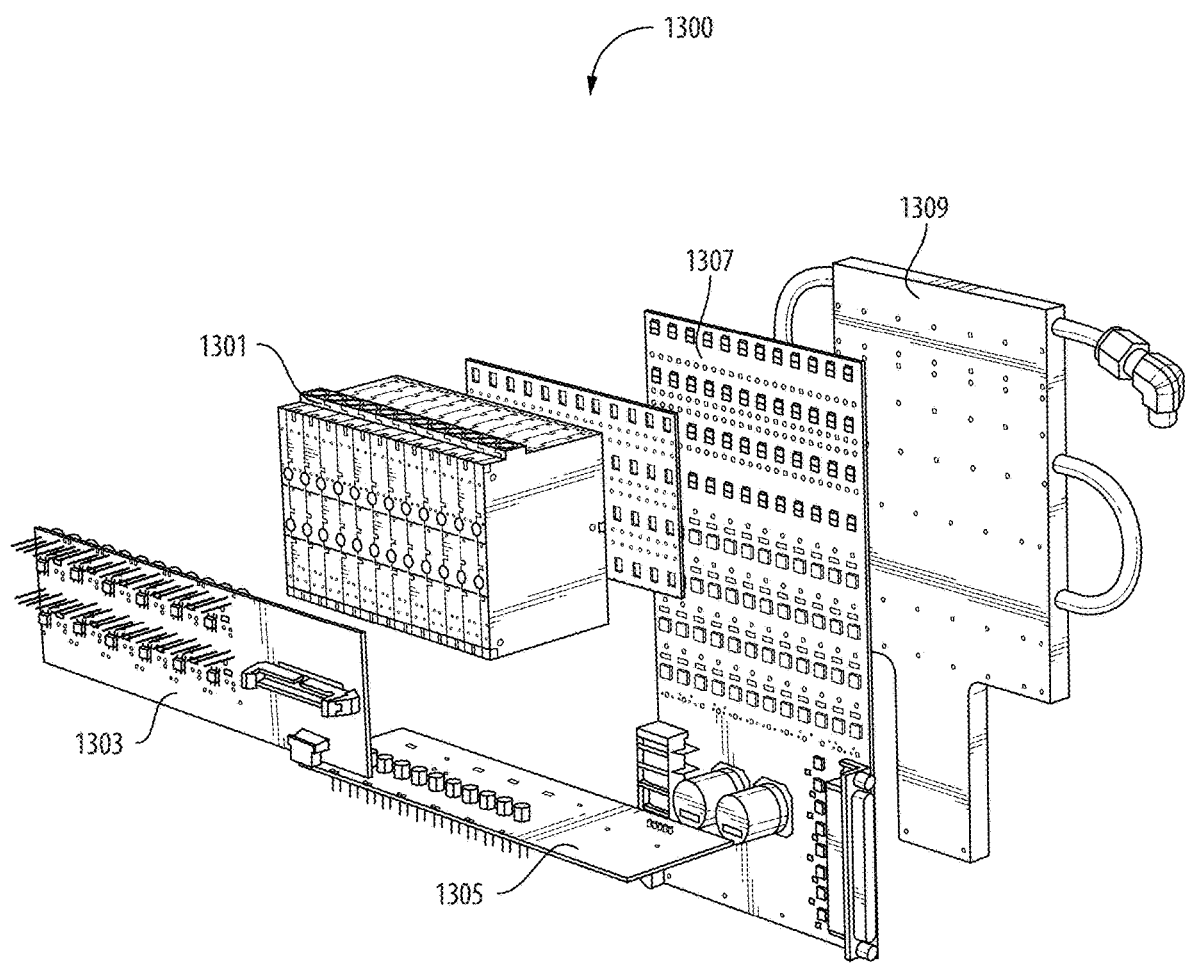
FIG. 15 shows an exploded view of an exemplary read head for use in the invention.

FIG. 15 shows an exploded view of an exemplary read head 1300 of a multi-well plate reader of the invention. The read head includes six independent optical channel modules 1301. Each optical channel module includes two independent optical channels and their respective objective lenses. Each optical channel module is attached to two printed circuit boards (PCB) (1303, 1305), which include photodiodes and independent picoammeter circuits. In the exemplary read head 1300, the PCBs 1303 and 1305 include a total of twelve photodiodes and twelve picoammeter circuits, with three of each devoted to a specific optical channel of an optical channel module. One photodiode and one picoammeter circuit are devoted to detecting an optical signal from emission light of an individual wavelength. The exemplary read head 1300 also includes a PCB 1307 for each optical-channel module that includes 8 high-powered LEDs, four dedicated to providing stimulation light of a different wavelengths for each individual optical channel. The read head also includes a heat exchanger 1309 to cool the LED PCBs.

Figure 16:
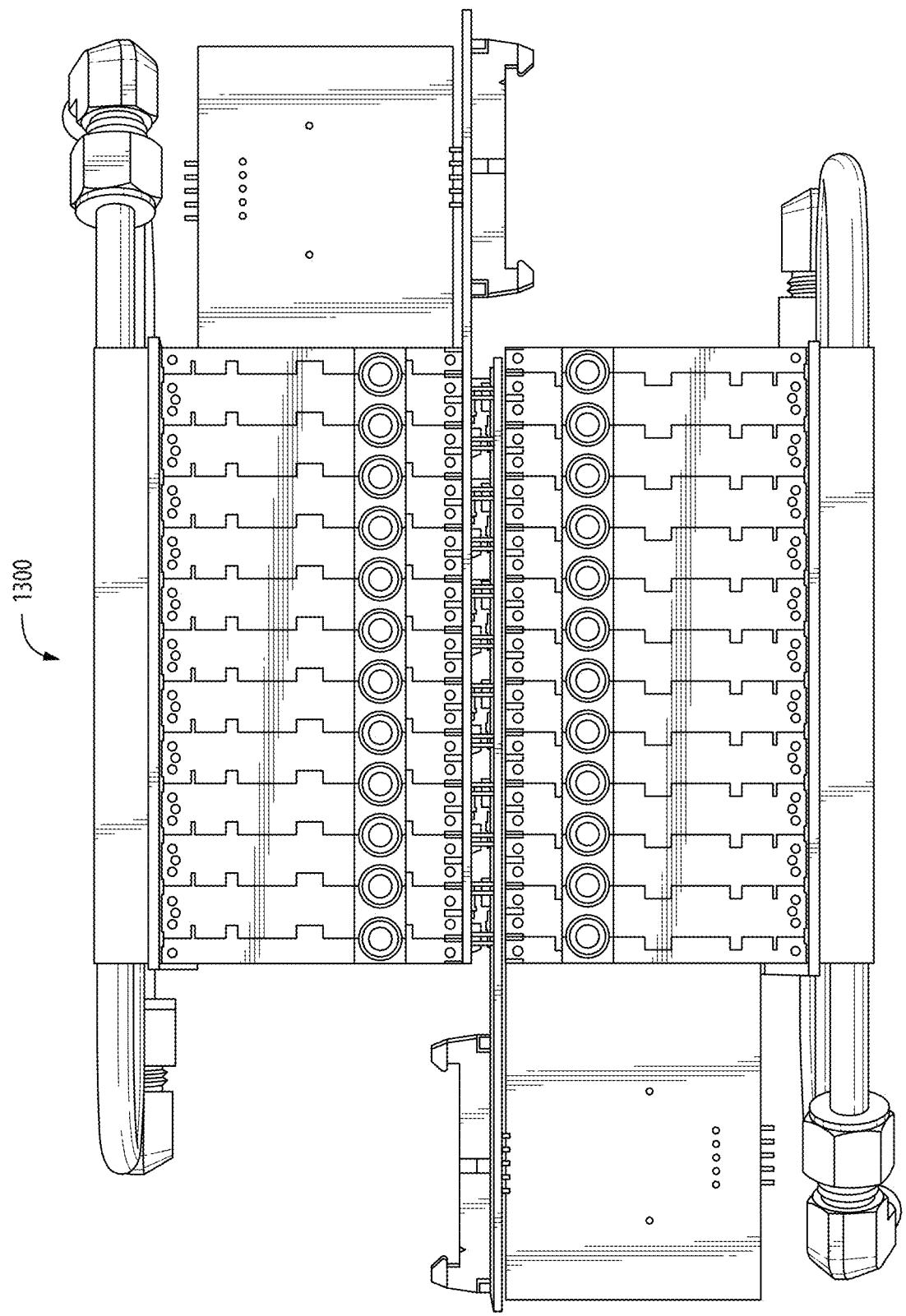
FIG. 16 shows a schematic of an exemplary read head.

FIG. 16 provides a schematic of the exemplary read head 1300 from alternative views. In this view, the objective lens of each optical channel are readily apparent.

Figure 17:
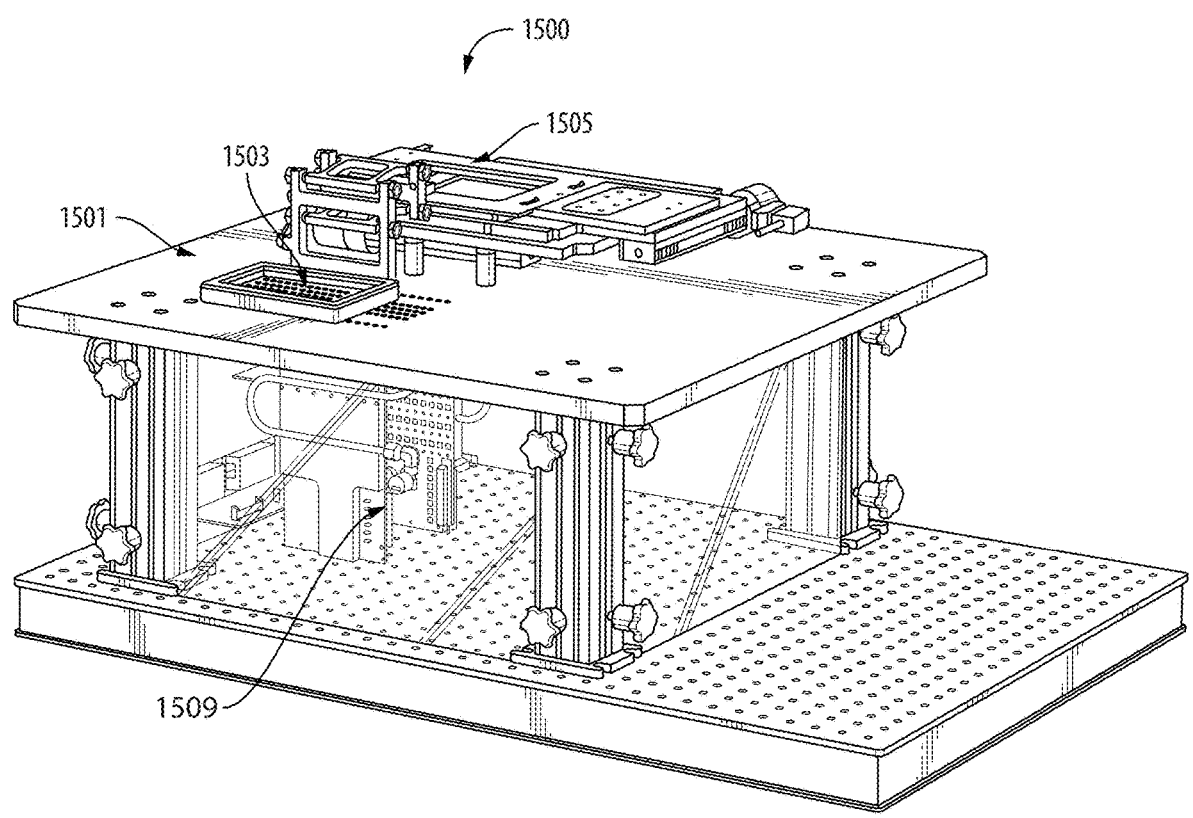
FIG. 17 shows a schematic of an exemplary plate reader.

FIG. 17 provides a schematic of an exemplary plate reader 1500 used in the systems and methods of the invention. A multi-well plate 1503 is disposed on a reading platform 1501 of the plate reader 1500. The plate reader also includes a plate pusher 1505, which translates the multi-well plate 1501 along multiple directions to align the wells of the multi-well plate 1501, such that they align with the objective lenses of the optical channels. The plate reader 1500 also includes motor controllers, which control motors of the plate pusher 1505 in order to align the wells.

The plate reader 1500 also includes LED and driver circuitry. Signals from the photodiode boards are routed to connector board 1507, and connected to the data acquisition system (DAQ), such as a COMPACTDAQ from National Instruments Corp. (Austin, TX). The DAQ may provide synchronized analog output control and analog input sampling across the optical channels, and thus the wells of the multi-well plate 1501. The DAQ may be connected by, for example, a USB connection to a workstation running control and/or data acquisition software.

Figure 18:
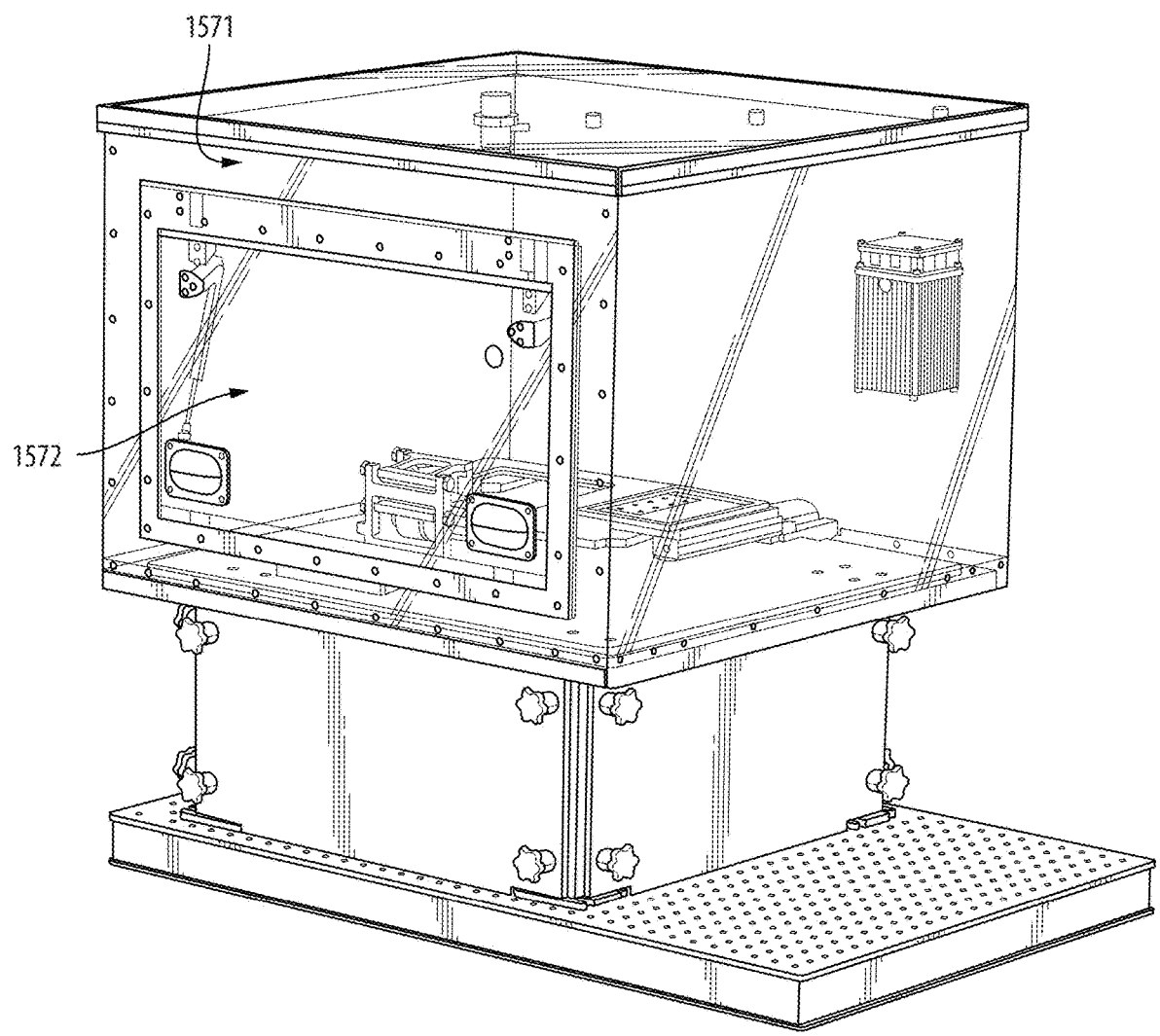
FIG. 18 shows a plate reader according to the invention with optional case.

FIG. 18 shows the plate reader with optional case 1571 that blocks external light and airborne contaminants from the plate reading platform. In certain aspects, the case 1571 may be removable. In certain aspects, the case includes a door or hatch 1572 to provide access to the plate reading platform.

Figure 19:
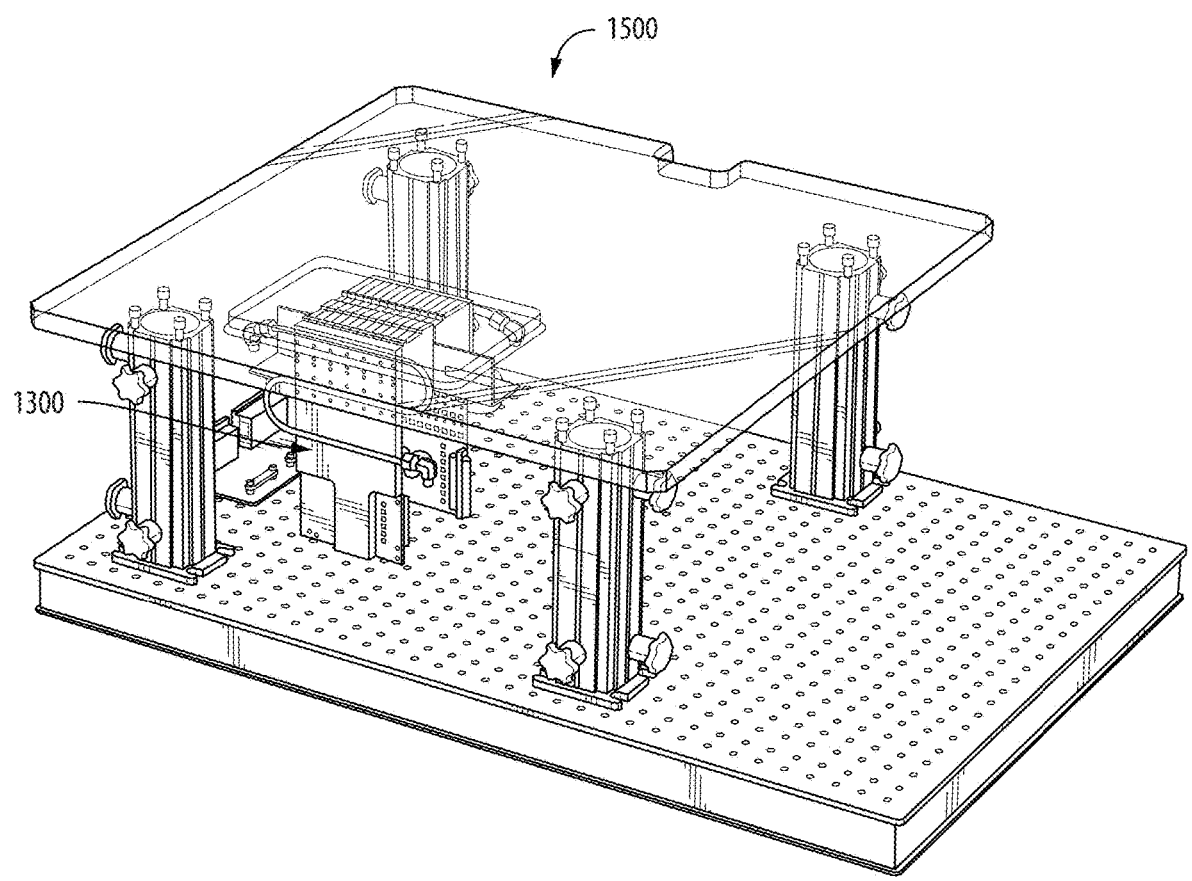
FIG. 19 shows a closeup view of an exemplary plate reader.

FIG. 19 provides a closeup view of exemplary plate reader 1500. In this view, two read heads 1300 can be seen, including the PCBs with picoammeter circuits/photodiodes 1305.

In certain aspects, the plate readers may include an environmental control subsystem operable to control environmental conditions associated with a sample in a multi-well plate positioned on the reader. The environmental control subsystem can control, for example, humidity, temperature, CO2 and other factors of the sample region. The environmental control subsystem can assure that the conditions in an aqueous medium in which cellular samples are contained within the well of a multi-well plate are maintained to keep the cells alive and functional. This is especially important in optogenetic assays that assess the activity of cells in response to a stimulus.

In certain aspects, the plate readers may include a microfluidic assembly to deliver fluids to wells in said multi-well plate. The assembly may, for example, deliver nutrients, such a cell medium, to keep the cells alive. The assembly can also, for example, deliver reagents, such as a compound of interest or a reference stimulus, to a sample in the wells of a multi-well plate. The plate reader may also contain a facility for sequentially loading a batch of plates within the instrument.

In certain aspects, the light channels are part of a light subsystem. The objectives and/or light subsystems of the plate readers may be coupled to the processing system 303. The processing system 303 may be operable to model activity of a cell in a well using emission light from the well. Further, in certain aspects, the light detectors of the optical channels may digitize the optical signals into digital signals. The processing system may analyze and/or store the digitized signals. The processing system may also, for example, model activity-related waveforms from the digitized signals.

Figure 20:
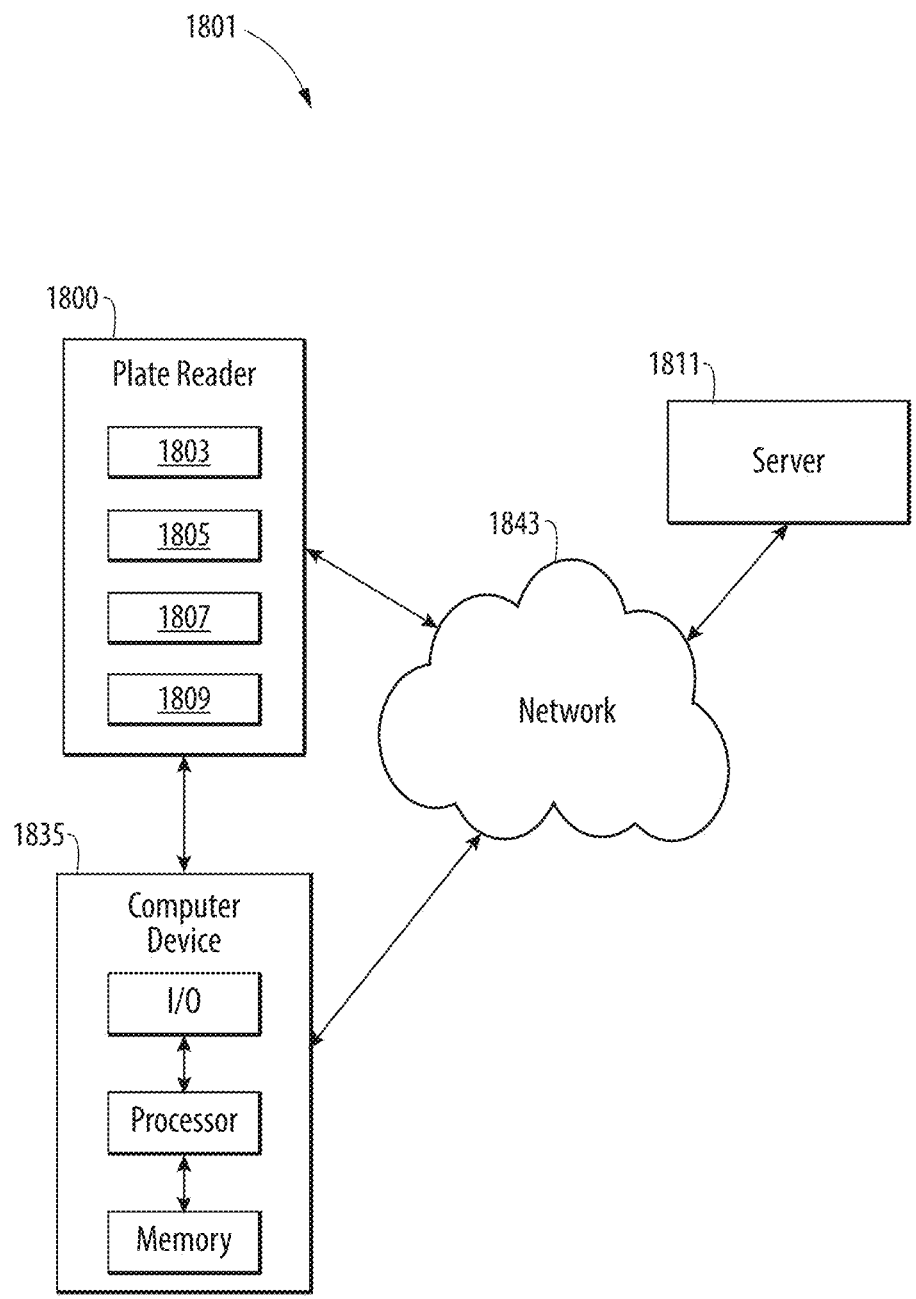
FIG. 20 shows a system for control and use of a plate reader.

FIG. 20 shows a schematic of a system 1801 for control and use of a plate reader 1800. The plate reader 1800 includes an optical system 1803, which includes the optical channels and their objectives. The plate reader 1800 is connected directly or via network 1843 to computer device 1835. Optionally, system 1801 may include or access a server computer 1811. The computer device 1835 includes may include an input/output, such as a touchscreen configured to display results from an assay and to control, for example, the emission light, plate pusher 1805, environmental control subsystem 1807, and microfluidic assembly 1809, via user input. Using system 1801, a user may activate an electrically active cell displayed on the touchscreen.

The system 1801 includes a computer device 1835 connected to the plate reader 1800, which will typically include a processor coupled to memory and one or more input/output device. Suitable I/O devices include monitor, keyboard, mouse, pointer, trackpad, touchscreen, camera, Wi-Fi card, network interface card, USB port, others, and combinations thereof. In certain embodiments, computer 1835 includes a touchscreen. The touchscreen may be configured to display a real-time image captured by the objective lens. The touchscreen can be operable to accept user inputs comprising touching the touchscreen. In some embodiments, the touchscreen can be manually controlled by a user to transmit stimulating light to a certain well of a multi-well plate. The touchscreen may be operable to control all aspects of the microscope, including position of the plate pusher, stimulation light intensity and/or wavelength, or any other factor relevant to the use and control of the plate reader.

EXAMPLES

Example 1: Single Well Validation Assay

A plate reader with a single optical-channel module was used to assay a 96-well plate that contained IPSC-derived cardiomyocytes expressing QuasAr2 voltage reporters. The cells were maintained in a cell culture in the plate.

Figure 21:
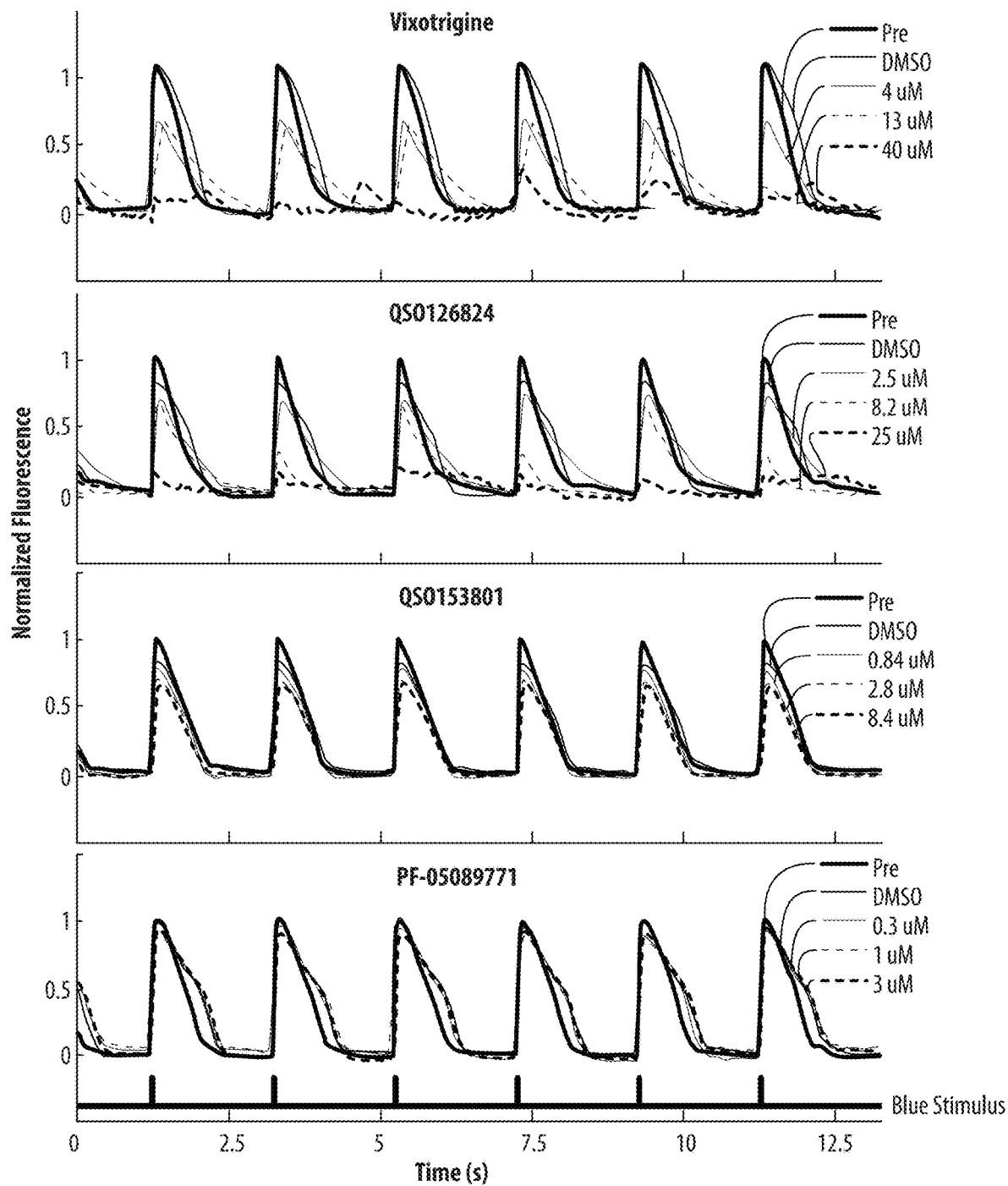
FIG. 21 shows results from an assay conducted according to the invention.

FIG. 21 shows the outcome of the assay. The line labeled "Blue Stimulus" indicates pulses of stimulating light transmitted by the plate reader to a single well of the plate, which caused actuation of CheRiff. This led to resulting changes in voltage and calcium ion concentration in the cells. The resulting changes in voltage were reported by QuasAr2, which was energized by red light transmitted from the plate reader and calcium ion concentration was reported by jRGECO1, which was energized by yellow light. Thus, the plate reader was able to accurately stimulate an actuator and two reporters in a single well of a multi-well plate with three separate wavelengths of light. Moreover, the plate reader was able to simultaneously detect the levels of two separate emission wavelengths of light.

Example 2: Optical-Channel Module Validation Assays

The same plate reader with a single optical-channel module was used to assay spiking HEK cells in the wells of a 384-well plate. The plate reader simultaneously assayed one well of the plate at a time—one with each optical-channel/objective of the optical-channel module addressing one well at a time.

A spiking HEK assay was performed on the SWARM instrument described herein. Results are presented for the Nav1.7 Spiking HEK assay performance in Swarm instrument.

Figure 22:
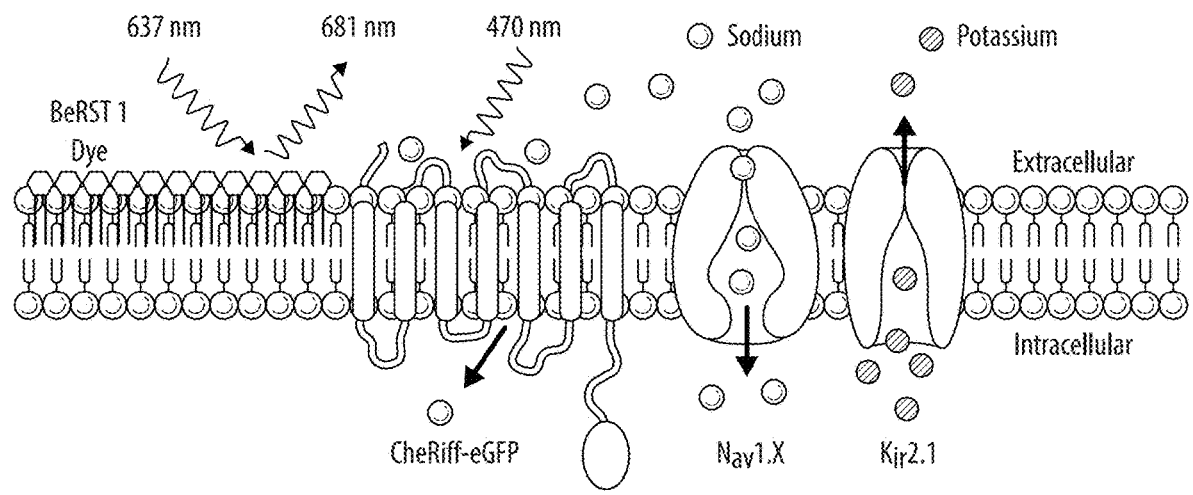
FIG. 22 shows components of a HEK cell assay.

FIG. 22 is a Schematic diagram of key components in Nav1.x spiking HEK cells, including voltage sensitive dye BeRST1, CheRiff-eGFP, Kir2.1 and the target of interest, Nav1.x channel.

Figure 23:
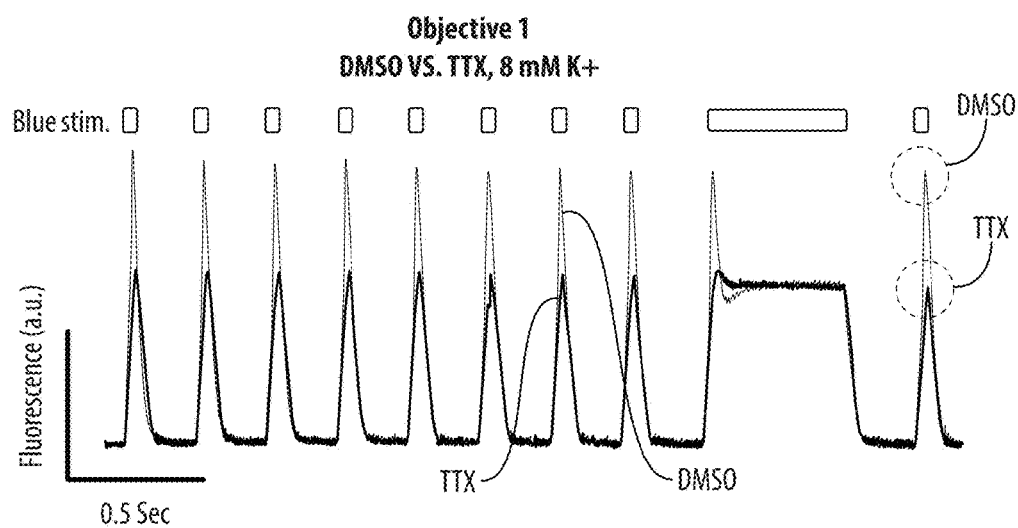
FIG. 23 shows representative fluorescent traces.

FIG. 23 shows representative fluorescent traces from eight wells of DMSO or 1 mM TTX treated Nav1.7 spiking HEK cells stimulated with a 10 test-pulse blue light stimulation protocol, imaged by Objective 1 of the Swarm instrument. The bath [K+] is 8 mM.

Figure 24:
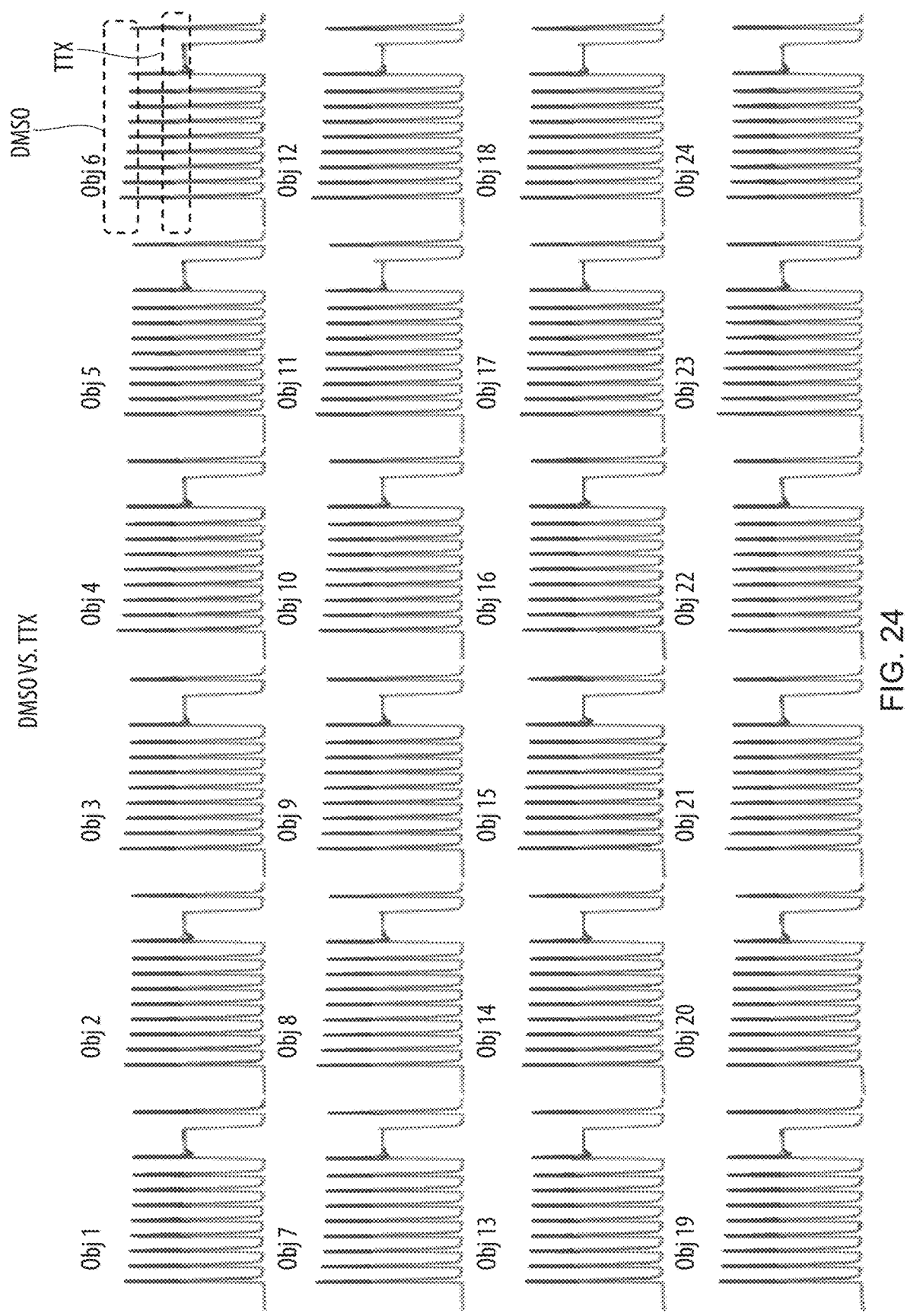
FIG. 24 shows fluorescent traces collected from 24 objectives.

FIG. 24 shows Fluorescent traces collected from all the 24 objectives. The Nav1.7 Spiking HEK cells were treated with either DMSO or 1 mM TTX and were stimulated by the 10 test-pulse blue light stimulation protocol. Each trace is averaged based on 8 adjacent wells imaged by the same objective.

Figure 25:
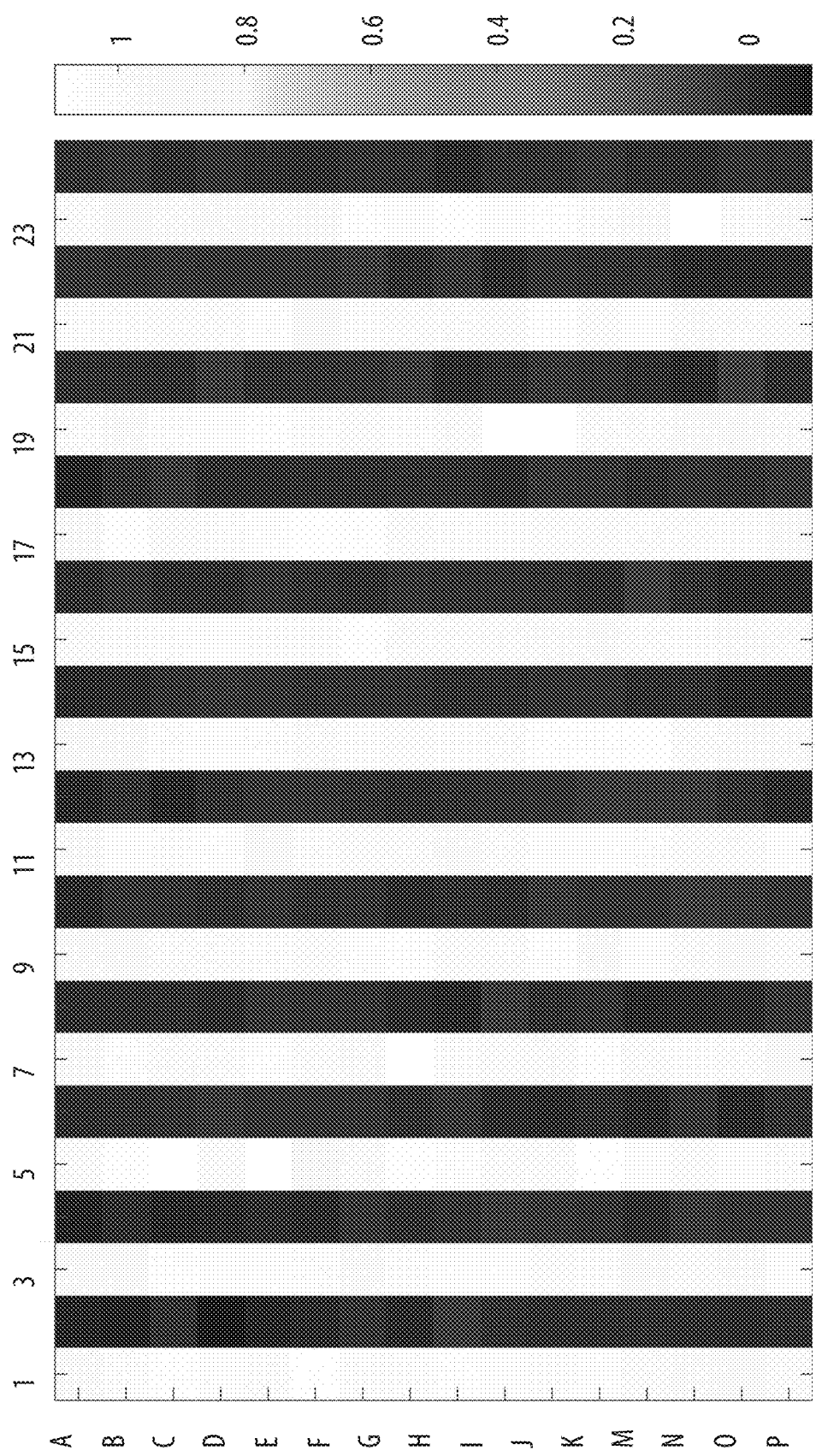
FIG. 25 shows a heat map from a sentinel plate.

FIG. 25 shows a heat map from a representative Nav1.7 spiking HEK 384-well sentinel plate. All the odd columns were treated with DMSO vehicle control and all the even columns are treated with 1 mM TTX. The assay is for spiking HEK cells. The cells were caused to express QuasAr2 as a voltage reporter, CheRiff as a voltage actuator to modulate membrane potential, Kir2.1 as a potassium channel to modulate membrane potential, and a Nav1.x channel (such as Nav1.5, Nav1.7, Nav1.8, Nav1.9, etc.) which is a voltage gated sodium channel. In addition, chemical sensors of membrane potential, intracellular calcium or other mediators may be utilized in this system. Such assays can be used, for example, to detect different mechanisms and compounds to block the activity of Nav1.x channels, which are targets of interest for reducing pain and other conditions. In this assay, Nav1.7 was expressed by the cells.

In addition to the cells, each well of the plate had either 185 nM of Nav1.7 blocker compound TTX, 5.6 µM amitriptyline, or a vehicle (0.5% DMSO) added. Each optical channel of the optical channel module simultaneously transmitted patterned blue light to a different well of the 96-well plate to stimulate CheRiff until the cells fired an action potential. The stimulation protocol consisted of eight pulses of blue light to measure response of the cells to the added compound, followed by a plateau triggered by the reference stimulus, and then followed by a final transmission of blue light to measure channel activity and pharmacological responses following previous activating signals.

Figure 26:
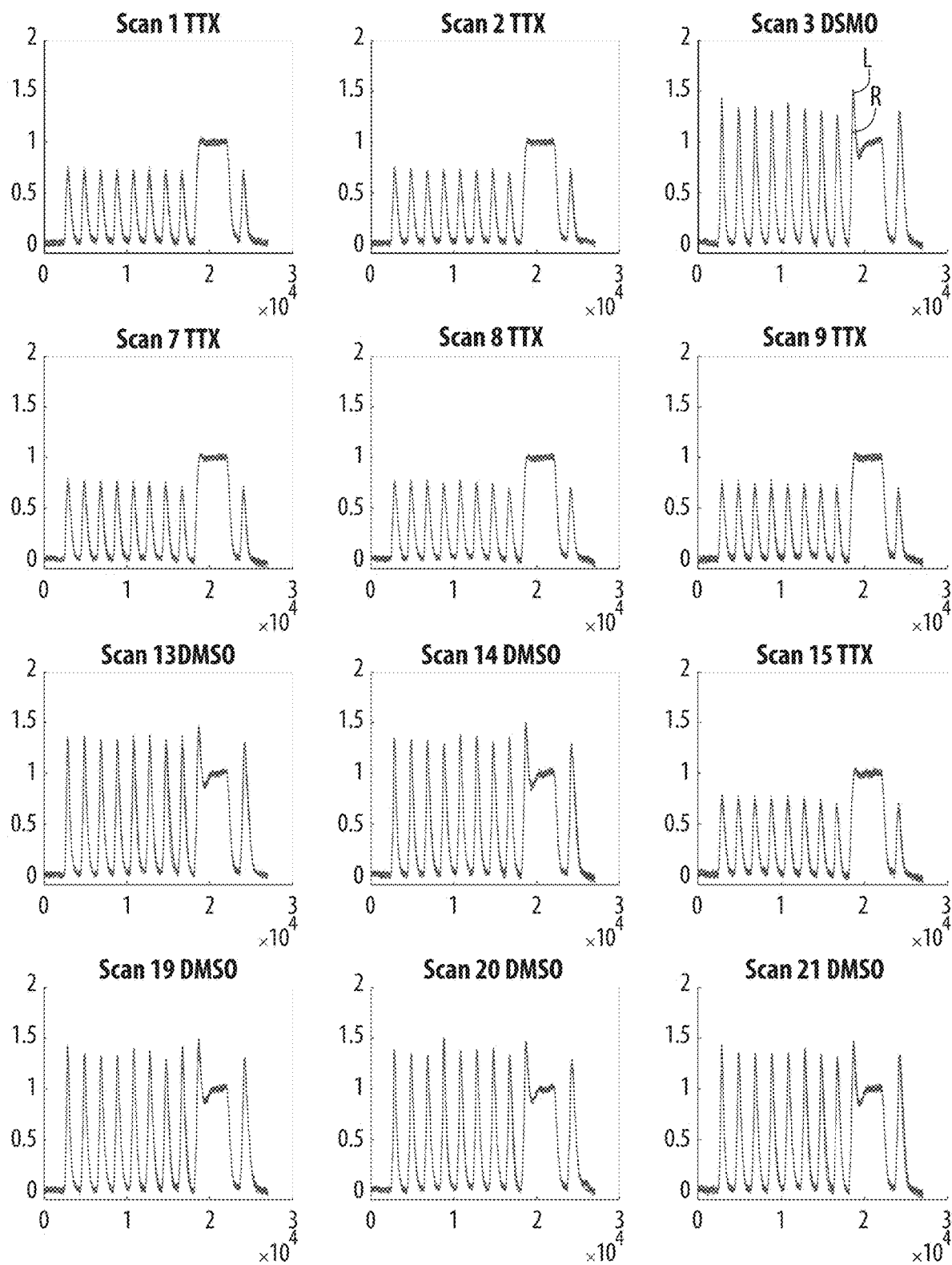
FIG. 26 shows scans from a first set of wells of a plate.

FIG. 26 gives scans 1, 2, 3, 7, 8, 9, 13, 14, 15, 19, 20, and 21 from a first half the wells of a plate in an exemplary L/R assay. The data are obtained from wells from a first half of an exemplary plate assayed by the optical channel module.

Figure 27:
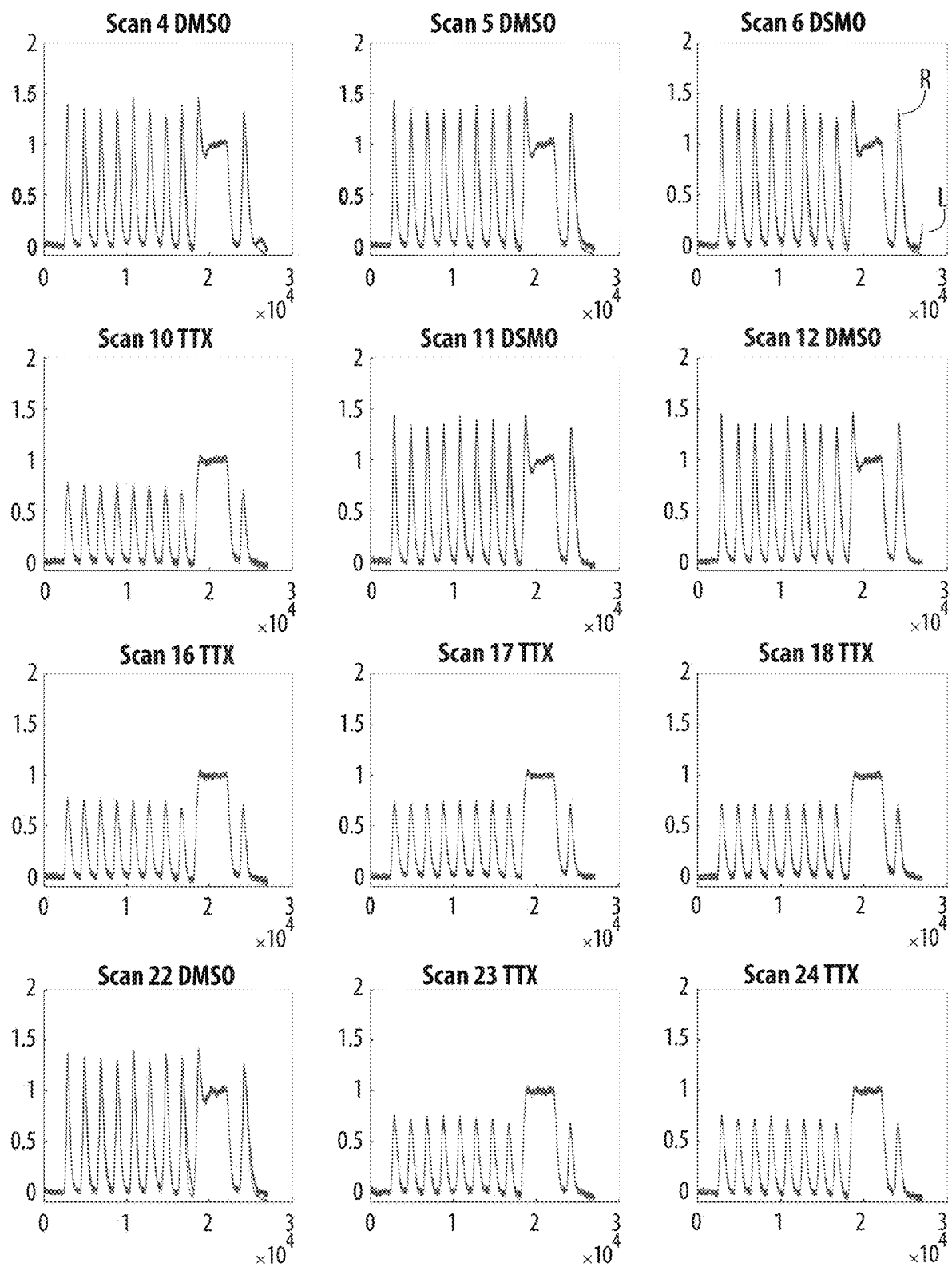
FIG. 27 shows scans from a second set of the wells.

FIG. 27 gives scans 4, 5, 6, 10, 11, 12, 16, 17, 18, 22, 23, and 24 from a second half the wells of a plate in the exemplary L/R assay The lines of different darkness (or colors), labeled "L" and "R" are from two different channels of the optical-channel module.

Figure 28:
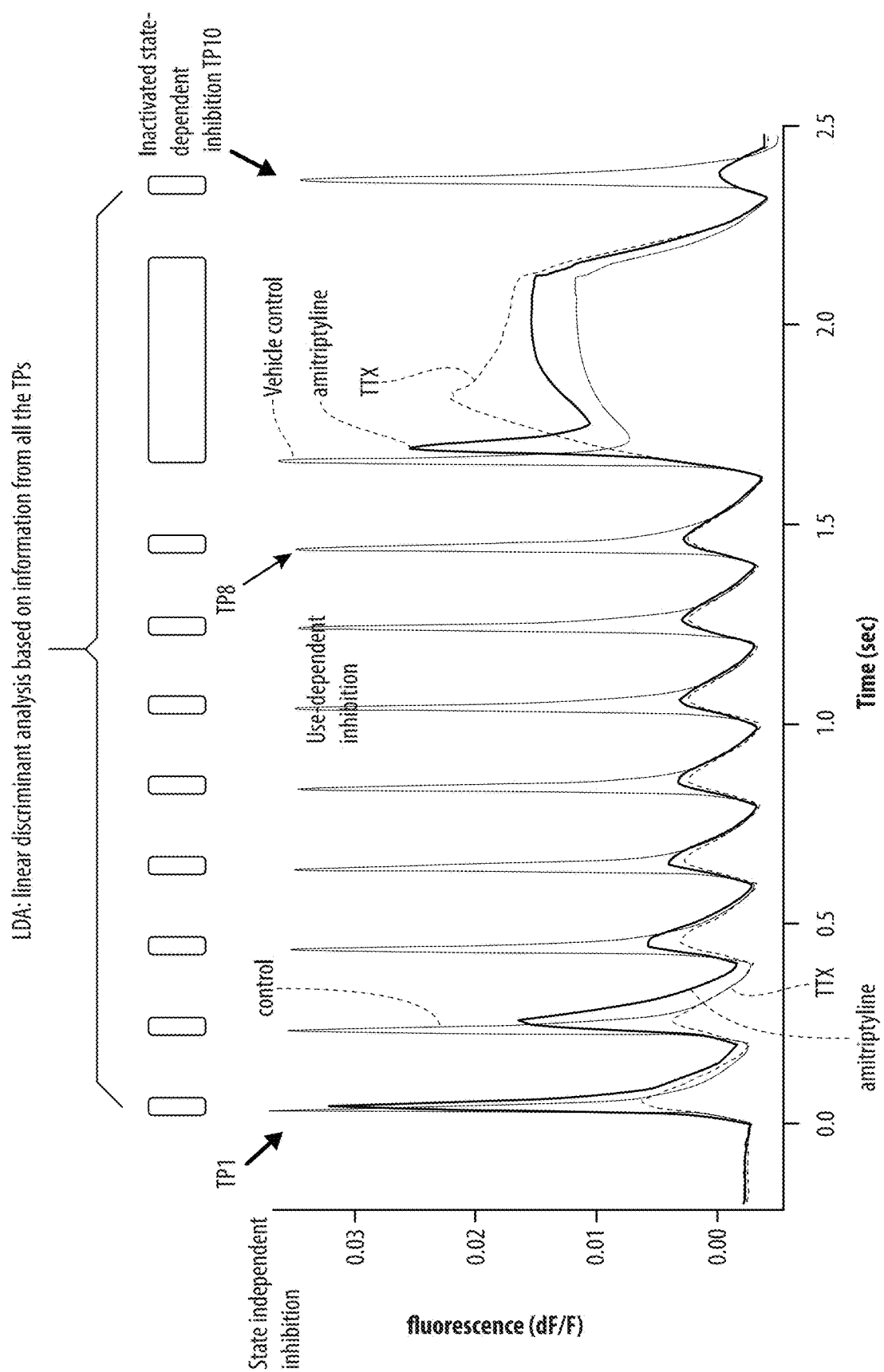
FIG. 28 provides and validated results.

FIG. 28 provides results previously obtained and validated results using a similar assay using an epi-fluorescence microscope. It is clear that the results of the L/R assay from the plate reader conformed to the validated results provided by the microscope.

Figure 29:
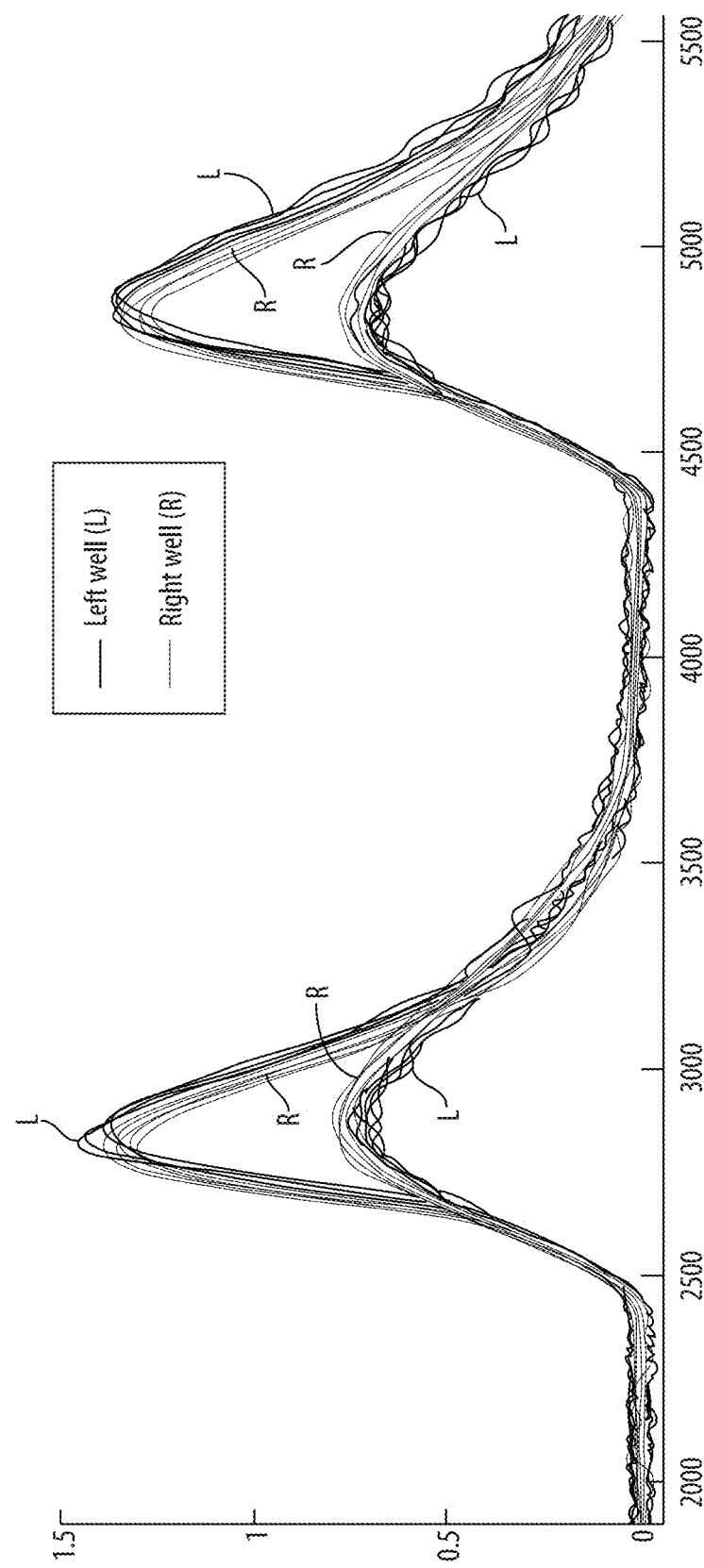
FIG. 29 shows an overlay of the results from two pulses.

FIG. 29 shows an overlay of the results from the first two pulses in each well as detected by each optical channel of the optical channel module. This figure shows that the results from each channel are consistent and repeatable, with only slight differences between each channel.

Figure 30:
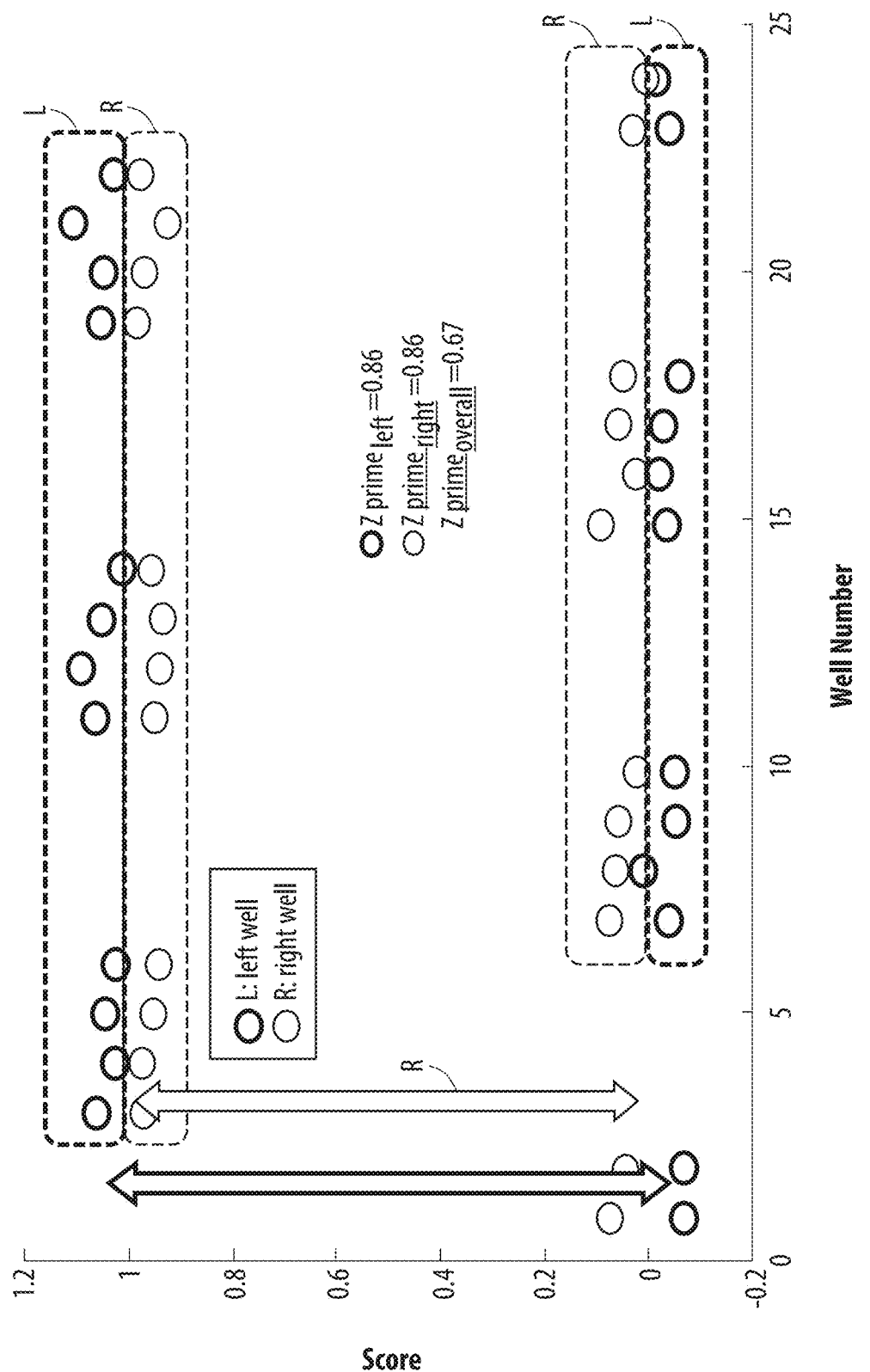
FIG. 30 provides the summary statistic for each channel.

FIG. 30 provides the summary statistic, Z-prime, calculated for each channel of the module. It is clear based on these results that even with the slight differences between channels, a desirable Z-prime was obtained for these assays.

Example 3: Simultaneous 24-Well Validation Assay

A plate reader with 12 optical-channel modules (i.e., two 12 read heads and 24 optical-channels/objectives) was used to simultaneously assay 24 individual wells of a multi-well plate. The wells of the plate contained OptoPatch system samples. The OptoPatch system is an all-optical electrophysiology system that uses mammalian neurons employed to directly report changes in transmembrane potential with excellent signal-to-noise properties. The neurons in the wells of each plate were caused to express Arch-based QuasArs as voltage reporters and CheRiff as a voltage actuator to modulate membrane potential.

This plate reader can apply stimulation waveforms independently to all four LED wavelengths of each optical-channel to each well with 16-bit resolution and up to 25 kS/s. The output of each of the 72 picoammeter outputs are digitized independently and simultaneously with 24-bit resolution at up to 10 kS/s. This allowed the optical channels to independently transmit stimulation light to the expressed CheRiff and excitation light to the Arch-based QuasArs expressed by the neurons contained in each of the wells. The stimulation light stimulated CheRiff, causing a change in the membrane potential of the neurons. The excitation light excited the QuasArs, which produced an optical signal indicative of the change in action potential caused by stimulation of CheRiff.

Figure 31:
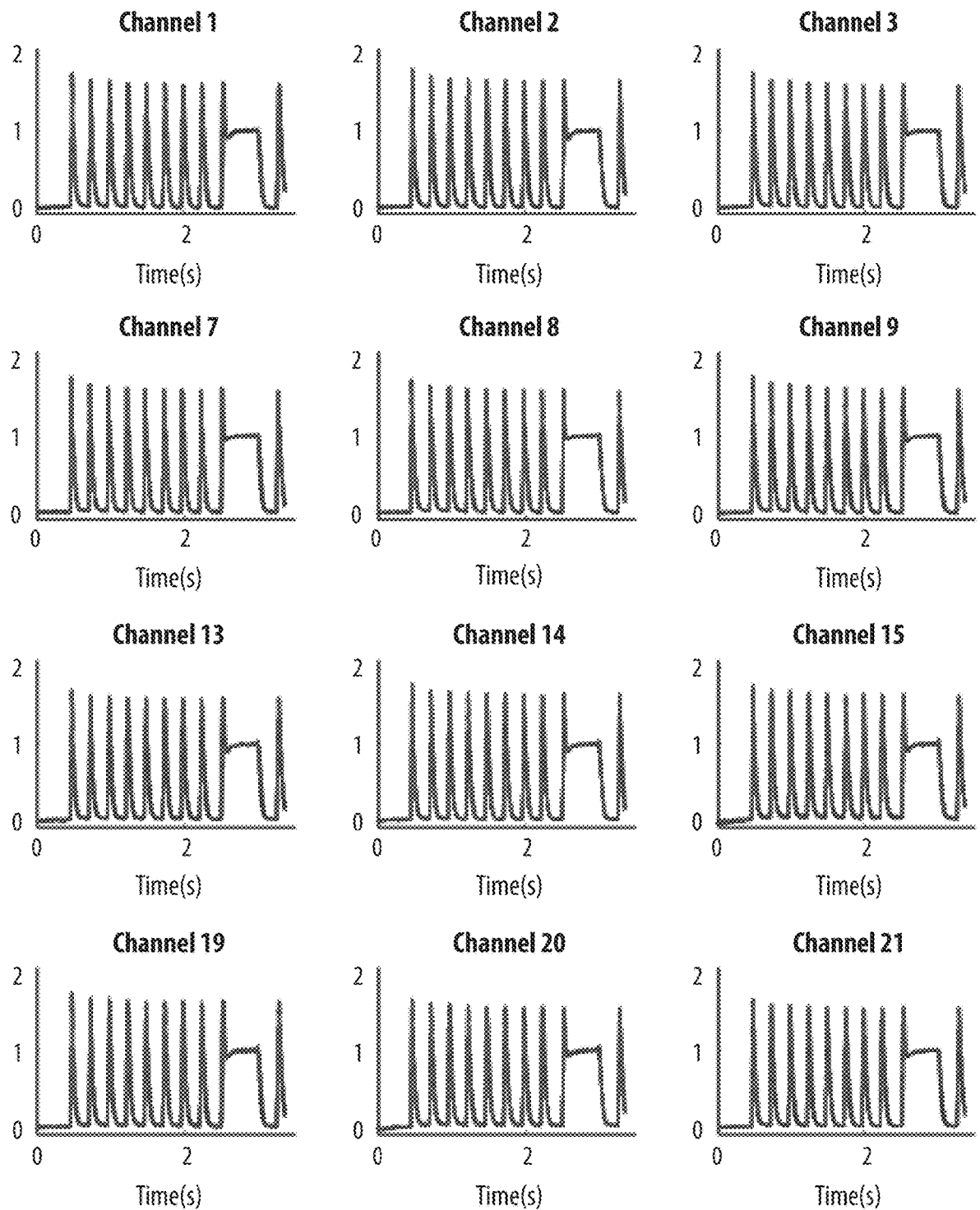
FIG. 31 provides the results of the stimulation assay for certain channels.

FIG. 31 provides the results of the 4 wavelength stim assay for channels 1, 2, 3, 7, 8, 9, 13, 14, 15, 19, 20, and 21.

Figure 32:
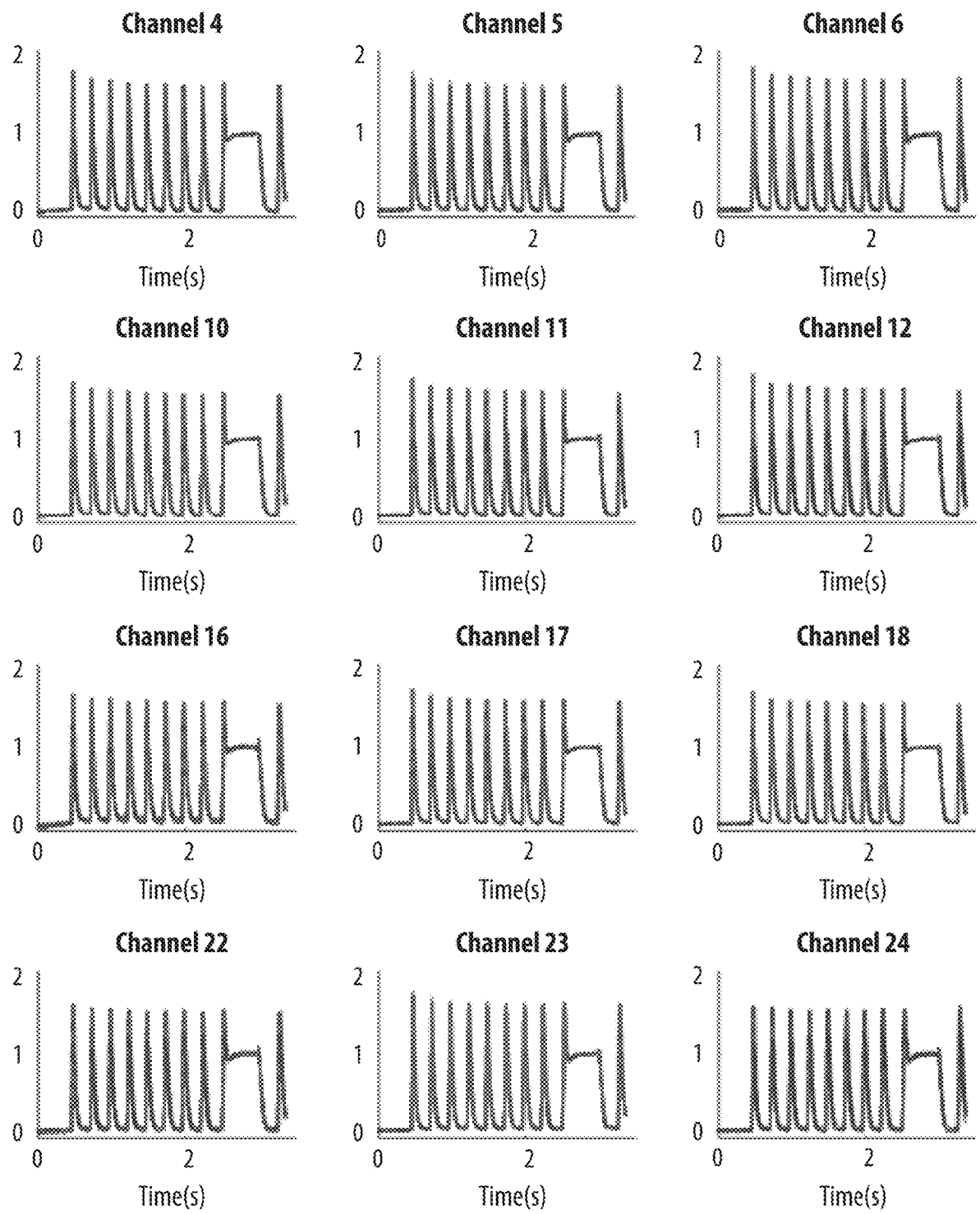
FIG. 32 provides the results of the stimulation assay or other channels.

FIG. 32 provides the results of the 4 wavelength stim assay for channels 4, 5, 6, 10, 11, 12, 16, 17, 18, 22, 23, and 24.

In the 4 wavelength stim assay, optical traces recorded using the optical channels aligned at the wells of the multi-well plate. For each optical channel, data from two separate wells are overlaid and shown as blue and magenta line respectively. The imaging frame rate is 2 kilohertz and bleach correction was applied. All the 24 wells optical channels are fully functional and provided consistent, repeatable results.

These results demonstrate that the plate reader of the invention can provide simultaneous, accurate, and repeatable results across several wells of a multi-well plate. Each pulsing protocol takes less than 5 seconds to complete, and it takes approximately 5 seconds to set up control signals and to align the wells of a plate with the objectives. This equates to approximately 5 minutes to change plates and scan a plate on the plate reader. Thus, when using 96-well plates, approximately 7,000 individual wells can be assayed per day. When using 384-well plates this throughput increases to approximately 20,000 wells per day, while 1,536-well plates provide an approximate 40,000 individual wells per day throughput. The plate readers of the invention can thus function in high-throughput screening (HTS) assays.

Example 4: Concentration Response Curve Analysis of Tool Compounds on Nav Channels Methods of the invention were used to evaluate the response of various tool compounds on different Nav subtypes. Methods of the invention were used to assess treatment of Nav subtypes using a spiking HEK cell assay. As shown in the Figure, Nav1.2 and Nav1.5 subtypes were stimulated at 2 Hz, using 8 test pulses prior to a 500 ms long pulse. Action potentials triggered by the third through eighth pulses are plotted. For Nav1.7, cells were stimulated at 4 Hz and all triggered action potentials were plotted.

Concentration response curves (CRC) were obtained for various tool compounds on different Nav subtypes.

Figure 33:
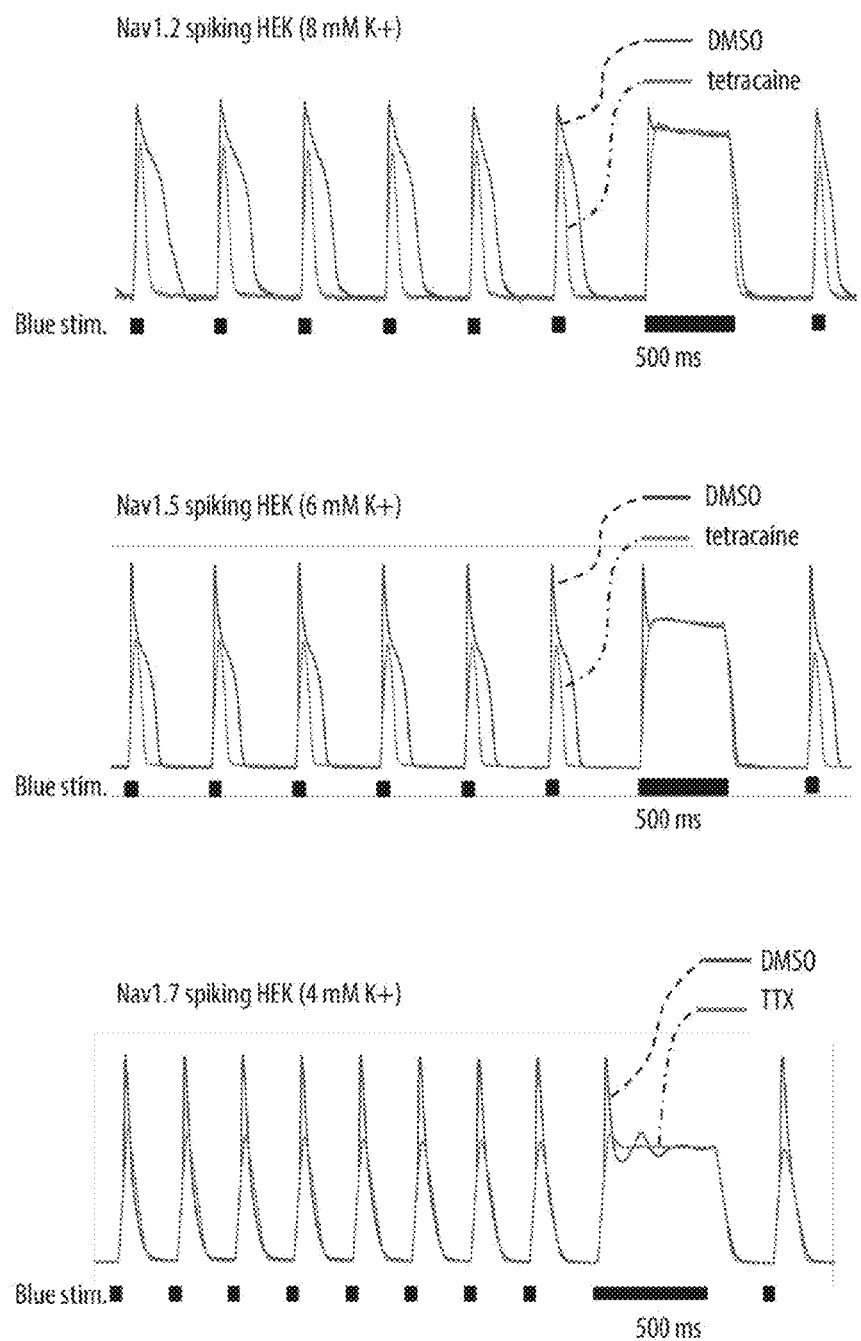
FIG. 33 shows representative fluorescent traces.

FIG. 33 gives Representative fluorescent traces from DMSO, 1 mM TTX or 10 mM tetracaine treated Nav1.2 spiking HEK cells (8 mM bath [K+]), Nav1.5 spiking HEK cells (6 mM bath [K+]) and Nav1.7 spiking HEK cells (4 mM bath [K+]). For Nav1.2 and Nav1.5 spiking HEK assays, the cells were stimulated at 2 Hz. Eight test pulses were applied before the 500 ms long pulse and only action potentials triggered by the third to the eighth pulses were plotted here; for Nav1.7 spiking HEK cells, the cells were stimulated at 4 Hz and all the triggered action potentials are plotted.

Figure 34:
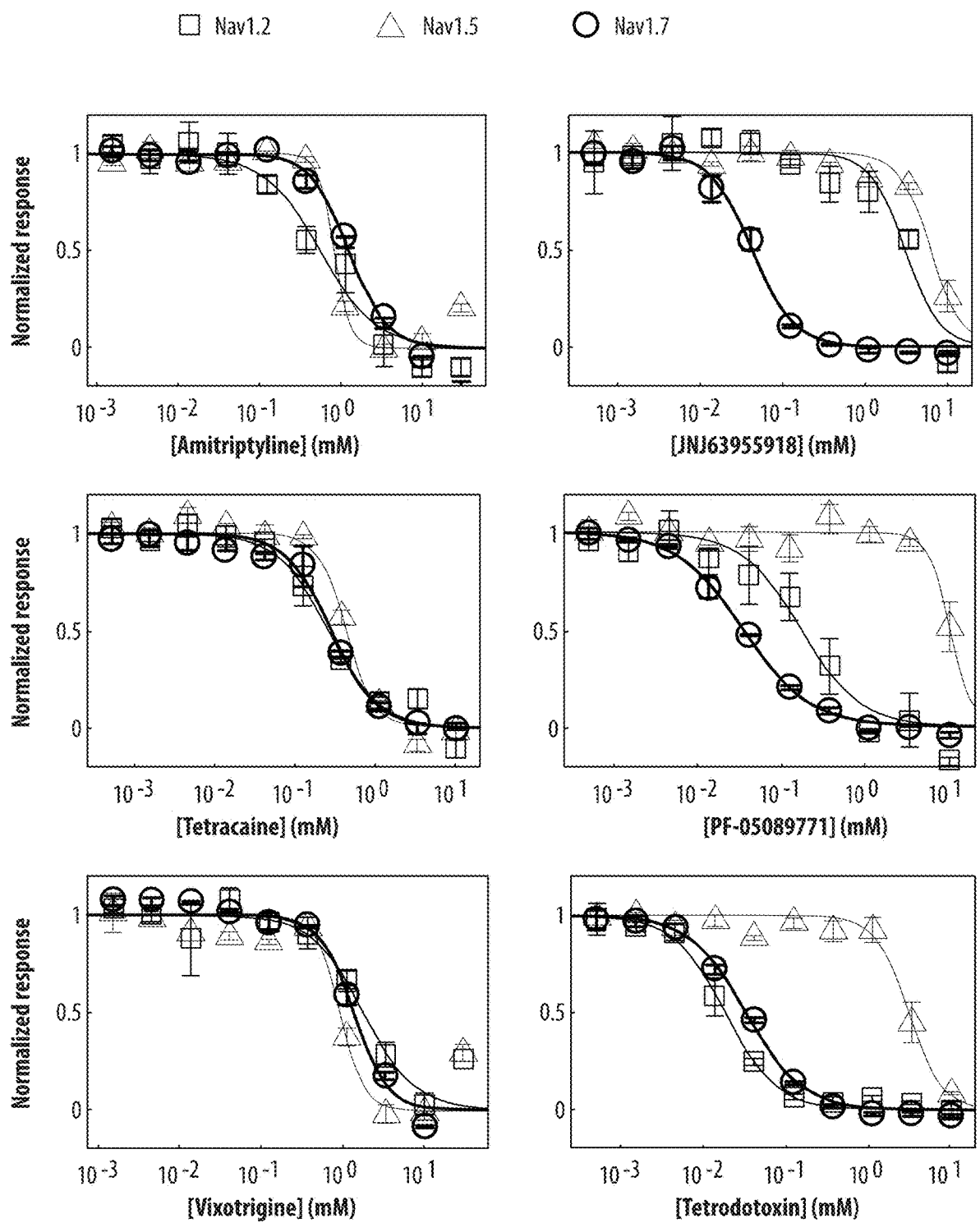
FIG. 34 shows concentration response curves (CRCs).

FIG. 34 shows concentration response curves (CRCs) of 3 non-selective Nav channel blockers (Amitriptyline, Tetracaine, vixotrigine) and 3 subtype-selective Nav channel blockers (JNJ63955918, PF-05089771, Tetrodotoxin) on Nav1.2 (8 mM bath [K+]), Nav1.5 (6 mM bath [K+]) and Nav1.7 (8 mM bath [K+]). Table 1. Nav1.x IC50 values and state dependence from 15 tool compounds with different potency and working mechanism. The state dependence is defined as the ratio of IC50 values of Nav1.7 spiking HEK assay at TP1 at 4 mM K+ over TP10 IC50 values at 8 mM K+.

FIG. 35 lists compounds that were used.

The results give CRCs for 3 non-selective Nav channel blockers (amitriptyline, tricaine, and vixotrigine) and 3 subtype-selective Nav Channel blockers (JNJ63955918, PF-05089771, and Tetrodotoxin) on Nav1.2, Nav1.5, and Nav1.7 channels. The IC50 values and state dependence using 15 tool compounds of differing potency and mechanisms of action are shown. The state dependence is defined as the ratio of IC50 values of Nav1.7 spiking HEK assay at time point 1 at 4 mM K+ over time point 10 values at 8 mM K+. Taken together, these results demonstrate that methods and plate readers of the invention are useful for assessing existing as well as unknown compounds for efficacy in blocking stimulation at Nav channels.

Example 5: Selectivity/Potency Assays

Scatter plots were made for tool compounds and for identified hits to show potency and selectivity of tool compounds and test compounds. The scatter plots show potency, selectivity and state dependence of tool compounds and identified hits.

Figure 36:
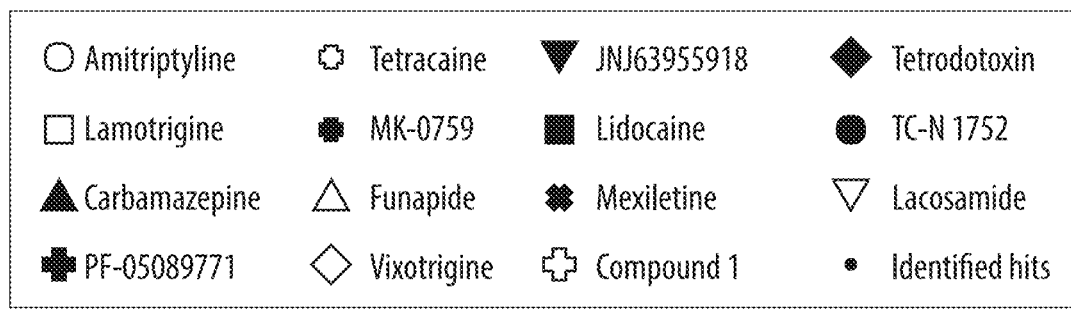
FIG. 36 is a scatter plot to show selectivity.
Figure 36:
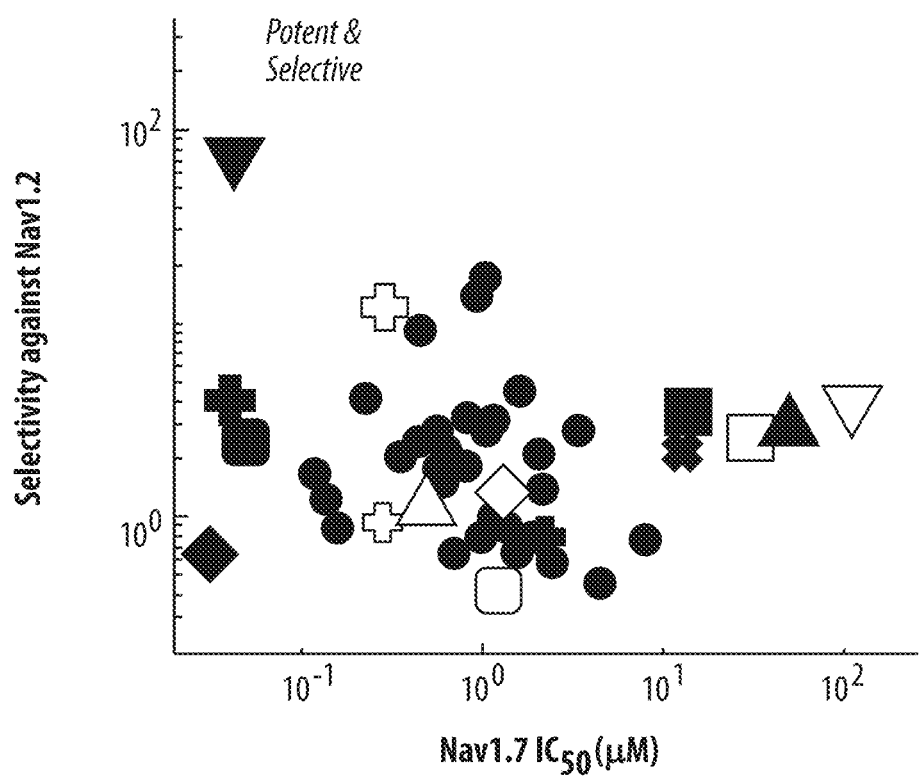

FIG. 36 is a scatter plot to show selectivity. For each Nav1.7 inhibitor, its subtype selectivity against Nav1.2, defined as the ratio of Nav1.2 IC50 value over Nav1.7 IC50 value, was plotted against its Nav1.7 IC50 values.

Figure 37:
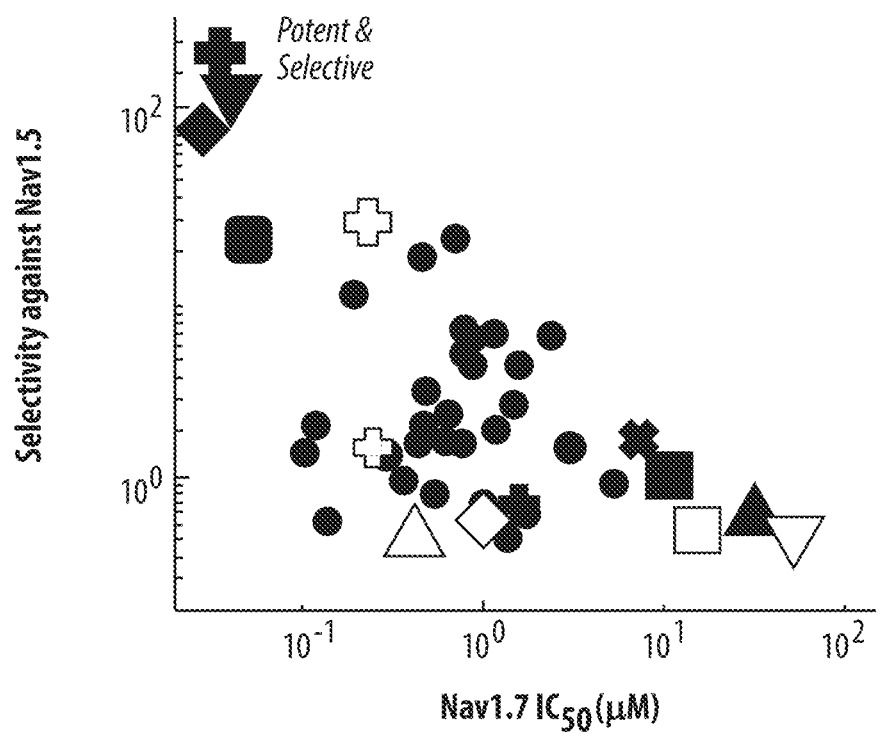
FIG. 37 is a scatter plot of subtype selectivity against Nav1.5.

FIG. 37 each Nav1.7 inhibitor, its subtype selectivity against Nav1.5, defined as the ratio of Nav1.5 IC50 value over Nav1.7 IC50 value, was plotted against its Nav1.7 IC50 values.

Figure 38:
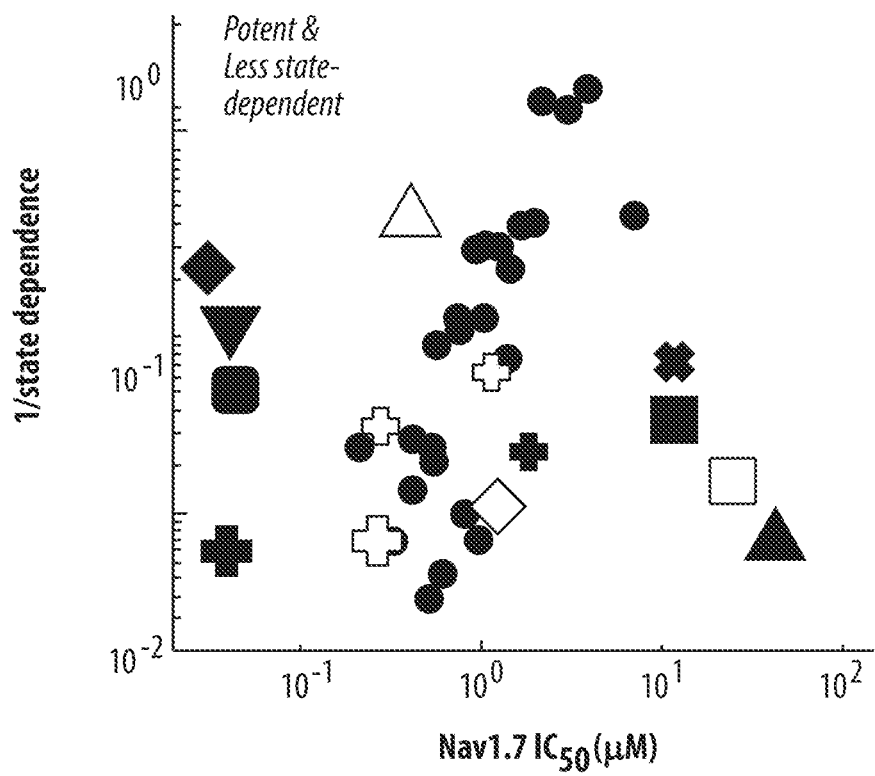
FIG. 38 is a scatter plot for potency on Nav1.7.

FIG. 38 is a scatter plot. For each Nav1.7 inhibitor, its reciprocal of state dependence was plotted against its potency on Nav1.7. In all the three panels, the compounds with desired property (potent, subtype selective and less state-dependence) distribute within the upper left quadrant. The results show that a plate reader of the invention provides multiplexed, high-throughput results useful to screen compounds for potent and/or selective interactions with various targets. The results are useful to discover hits, compounds with promise as effective new drugs.

Example 6: IPSC-Derived Cardiomyocyte Validation Assay

A 24 objective plate reader of the invention was used to assay a 96-well plate that contained IPSC-derived cardiomyocyte expressing jRGECO1a calcium sensors, CheRiff actuators, and loaded with BeRST1 fluorescent voltage sensitive dye.

Figure 39:
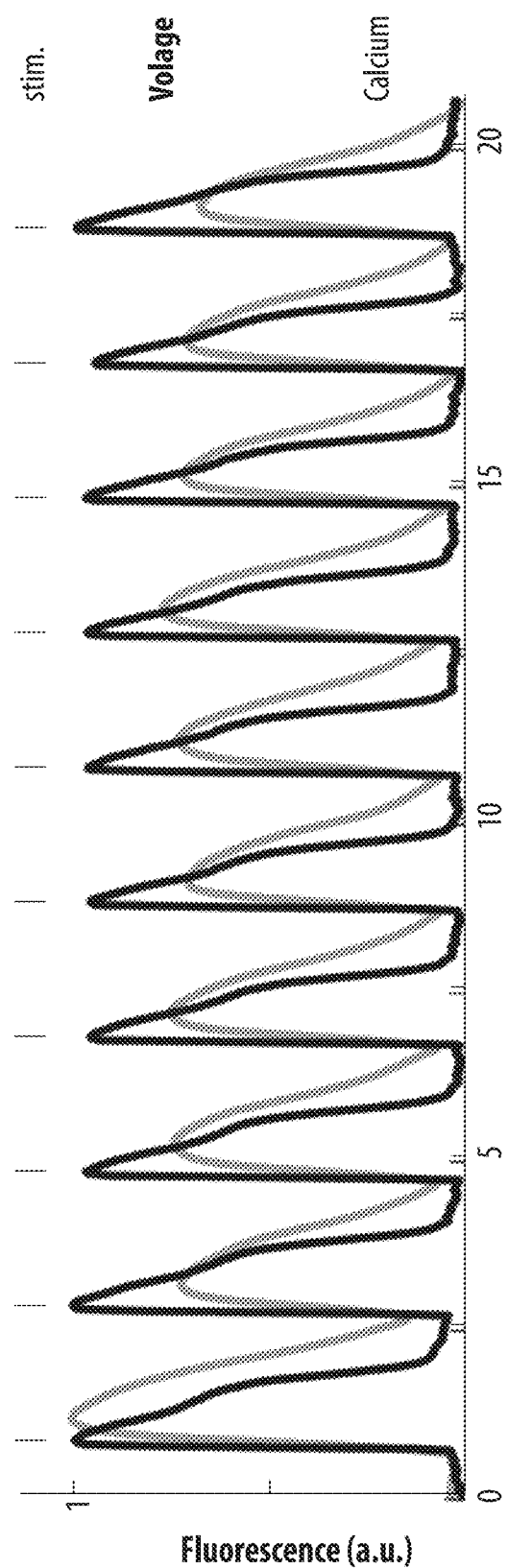
FIG. 39 shows the outcome of the simultaneous voltage and calcium imaging using a plate reader of the invention.

FIG. 39 shows the outcome of the simultaneous voltage and calcium imaging on the Swarm instrument. The line labeled "stim" indicates pulses of stimulating light transmitted by the plate reader to multiple wells of the 96-well plate, which caused actuation of CheRiff. This led to resulting changes in voltage and calcium ion concentrations in the cells. The resulting changes in voltage were reported by BeRST1, which was energized by red light transmitted from the plate reader. Calcium ion concentration was reported by jRGECO1, which was energized by yellow light. Thus, the plate reader was able to accurately stimulate an actuator and two reporters in multiple wells of a multi-well plate with three separate wavelengths of light. Moreover, the plate reader was able to simultaneously detect the levels of two separate emission wavelengths of light.

Figure 40:
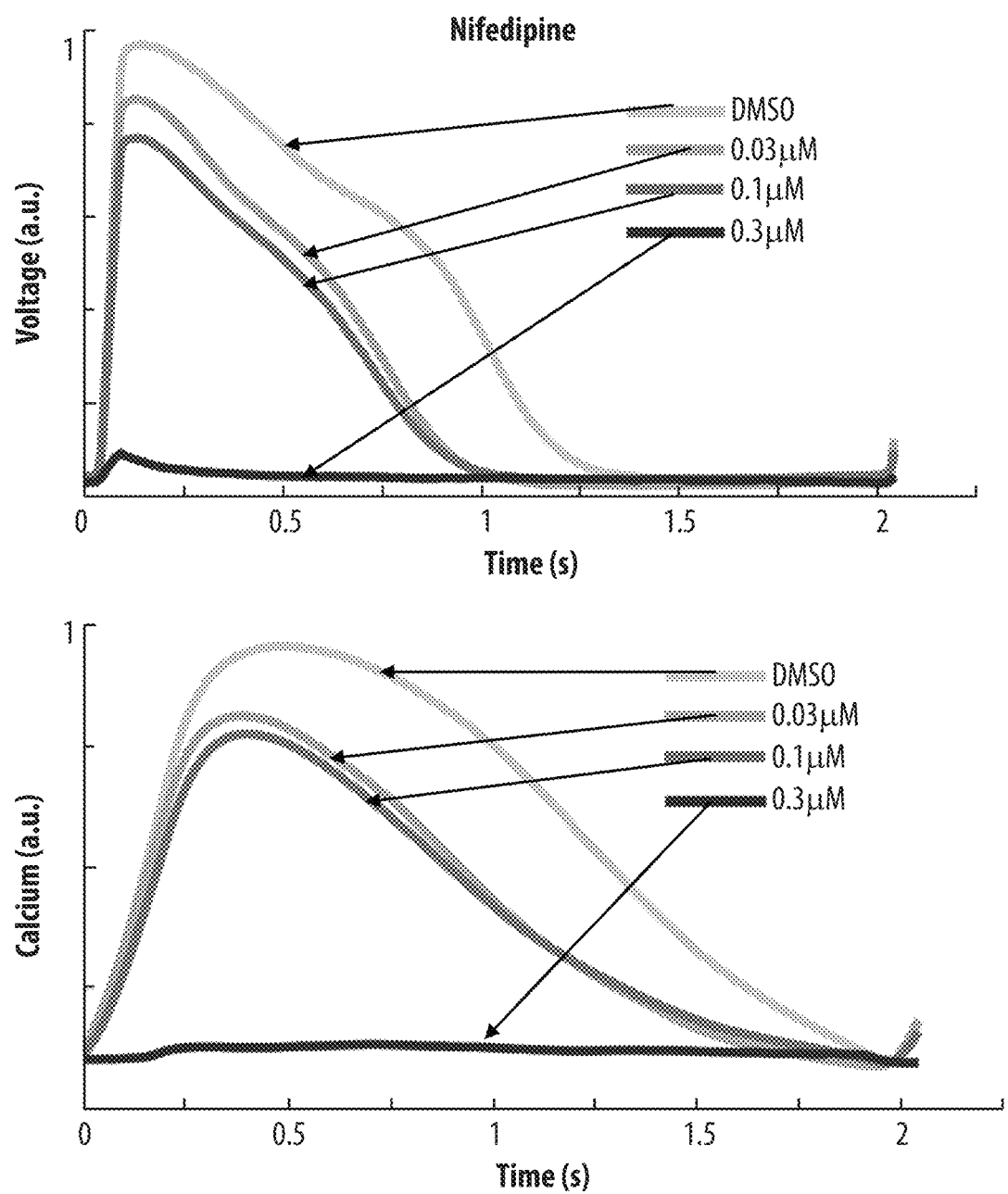
FIG. 40 shows voltage and calcium waveforms.
Figure 41:
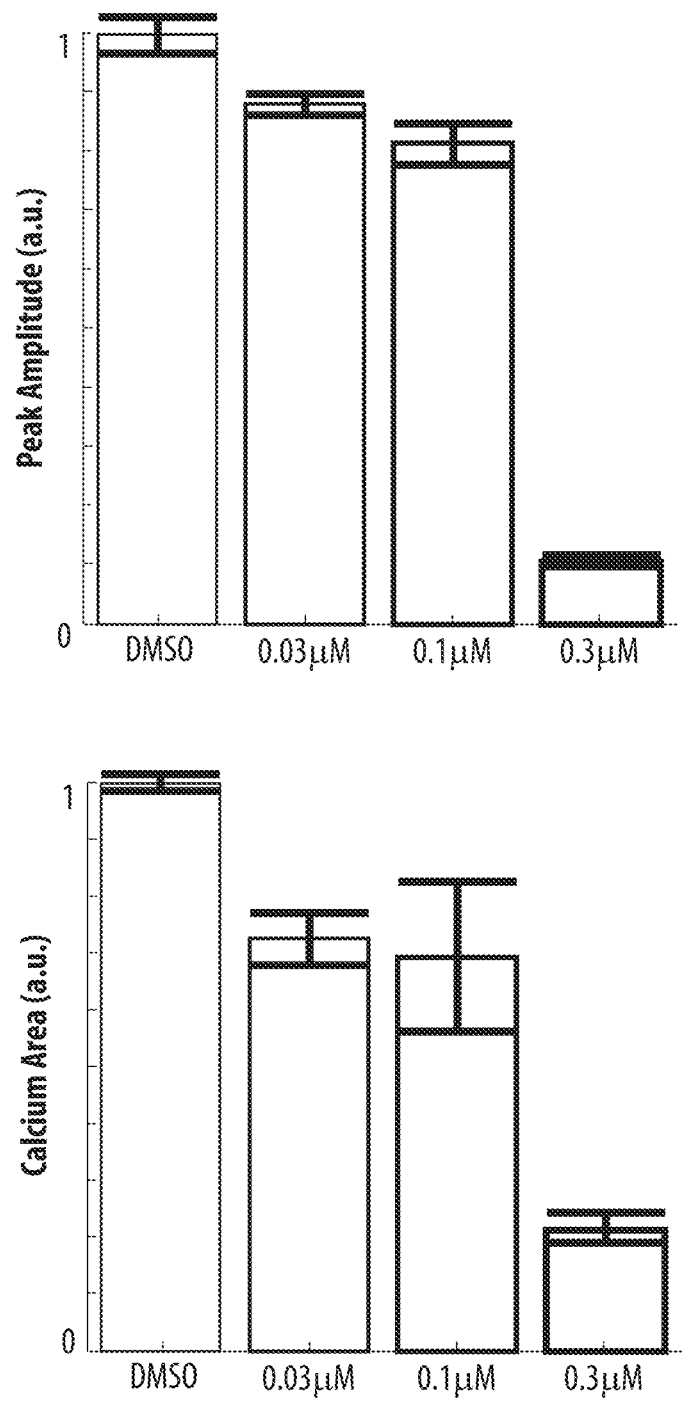
FIG. 41 shows the quantification of the voltage peak amplitude and the integrated calcium area from 3 wells at differing concentrations using the waveforms shown in FIG. 40.

FIG. 40 shows validation of the assay with tool pharmacology such as the calcium channel blocker Nifedipine. The voltage and calcium fluorescence waveforms in FIG. 40 show the average epoch of the 10-test pulse blue stimulation protocol. FIG. 41 shows the quantification of the voltage peak amplitude and the integrated calcium area from 3 wells of each concentration. Increasing concentration of Nifedipine altered both the voltage action potential waveform and calcium transients until it was completely extinguished at 0.3 µM.

Incorporation by Reference

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:
1. A method for assaying biological activity, the method comprising:
   providing a sample comprising cells including optical reporters of cellular activity wherein the cells are in a well of a multi-well plate;
   positioning the multi-well plate on a plate reader comprising a plurality of optical channels corresponding to a respective plurality of wells of the multi-well plate, wherein each optical channel is operable to provide to one well of the plurality of wells excitation and stimulation light of different wavelengths and to simultaneously read optical signals of different wavelengths from the one well;
   stimulating, via one optical channel of the plurality of optical channels, the sample with a reference stimulus;
   detecting by the one optical channel an optical signal produced in response to the reference stimulus;
   exposing the sample to test conditions modeling a biological and/or chemical stimulus of the cellular activity;
   detecting by the one optical channel an optical signal produced in response to the test conditions; and
   calibrating the test signal to the reference signal to predict a level of activity of the cells in response to the modeled biological and/or chemical stimulus.

2. The method of claim 1, wherein the optical reporters are fluorescent reporters of membrane electrical potential.

3. The method of claim 1, wherein the cellular activity is caused by neurons.

4. The method of claim 3, wherein the cells include optical actuators of electrical activity.

5. The method of claim 4, wherein the optical actuators of electrical activity include one or more light-gated ion channels.

6. The method of claim 5, wherein the light-gated ion channels include one or more algal channelrhodopsins.

7. The method of claim 6, wherein the reference stimulus is blue light transmitted to the cells.

8. The method of claim 7, wherein the test conditions include synaptic transmission by pre-synaptic neurons connected to the cells via synapses.

9. The method of claim 1, wherein the calibrating step corrects for inherent variability across a plurality of assays.

10. The method of claim 1, wherein the sample is a multi-well plate and a plurality of wells of the plate comprise the cells comprising optical reporters of cellular activity.

11. The method of claim 10, wherein the stimulating step comprises transmitting the reference stimulus to the cells in a plurality of the wells.

12. The method of claim 11, wherein the stimulating step comprises transmitting the reference stimulus to every well of the multi-well plate.

13. The method of claim 11, wherein detecting the optical signal produced in response to the test conditions comprises simultaneously detecting an optical test signal from each of the plurality of wells.

14. The method of claim 13, wherein the optical test signal from each of the plurality of wells is detected by a different detection module of a plate reading device.

15. The method of claim 14, wherein the optical reporters are fluorescent reporters of membrane electrical potential.

16. The method of claim 15, wherein the cells are neurons.

17. The method of claim 16, wherein the cells include optical actuators of electrical activity.

18. The method of claim 17, wherein the optical actuators of electrical activity include one or more light-gated ion channels.

19. The method of claim 17, wherein the light-gated ion channels include one or more algal channelrhodopsins.

* * * * *